(12) United States Patent
Hummel et al.

(10) Patent No.: US 11,149,609 B2
(45) Date of Patent: Oct. 19, 2021

(54) AFTERTREATMENT SYSTEM FOR MIXING A REDUCTANT IN AN EXHAUST GAS FLOWING THERETHROUGH

(71) Applicant: CUMMINS EMISSION SOLUTIONS INC., Columbus, IN (US)

(72) Inventors: Ken Hummel, Barneveld, WI (US); John Ringstad, Oregon, WI (US); Atul S. Abhyankar, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 16/757,256

(22) PCT Filed: Oct. 20, 2017

(86) PCT No.: PCT/US2017/057624
§ 371 (c)(1),
(2) Date: Apr. 17, 2020

(87) PCT Pub. No.: WO2019/078886
PCT Pub. Date: Apr. 25, 2019

(65) Prior Publication Data
US 2021/0189937 A1    Jun. 24, 2021

(51) Int. Cl.
*F01N 3/20* (2006.01)
*F01N 3/28* (2006.01)
*F01N 3/021* (2006.01)

(52) U.S. Cl.
CPC ......... *F01N 3/2066* (2013.01); *F01N 3/2821* (2013.01); *F01N 3/2892* (2013.01);
(Continued)

(58) Field of Classification Search
CPC .... F01N 3/2066; F01N 3/2821; F01N 3/2892; F01N 2610/02; F01N 2560/14; F01N 2470/14; F01N 2560/026; F01N 3/021
See application file for complete search history.

(56) References Cited

U.S. PATENT DOCUMENTS

| | | | |
|---|---|---|---|
| 8,747,788 B1 * | 6/2014 | Baig .................. | B01D 53/9454 423/212 |
| 2004/0126289 A1 * | 7/2004 | Grandlund .......... | F01N 13/1838 422/245.1 |

(Continued)

OTHER PUBLICATIONS

International Search Report and Written Opinion issued for International Application No. PCT/US2017/057624, dated Jan. 17, 2018, 16 pages.

*Primary Examiner* — Brandon D Lee
(74) *Attorney, Agent, or Firm* — Foley & Lardner LLP

(57) ABSTRACT

An SCR system includes at least one catalyst, and an intake conduit. The intake conduit includes an intake conduit first sidewall, at least a portion of which defines a first curvature. An intake conduit second sidewall is coupled to the intake conduit first sidewall so as to define the intake conduit. A catalyst is fluidly coupled to the intake conduit through the intake conduit second sidewall. The intake conduit second sidewall is inclined at a first angle with respect to a longitudinal axis of the SCR system, such that an intake conduit second end cross-section of the intake conduit is smaller than an intake conduit first end cross-section. An intake conduit third sidewall is positioned at the intake conduit second end. The intake conduit is structured to produce an even flow split of the exhaust gas through the intake conduit internal volume towards the catalyst.

28 Claims, 20 Drawing Sheets

(52) U.S. Cl.
CPC .......... *F01N 3/021* (2013.01); *F01N 2470/14* (2013.01); *F01N 2560/026* (2013.01); *F01N 2560/14* (2013.01); *F01N 2610/02* (2013.01)

(56) References Cited

U.S. PATENT DOCUMENTS

| | | | |
|---|---|---|---|
| 2011/0146253 A1 | 6/2011 | Isada et al. | |
| 2012/0102928 A1* | 5/2012 | Hehle | F01N 3/0821 60/295 |
| 2012/0227390 A1 | 9/2012 | Wikaryasz et al. | |
| 2015/0238901 A1* | 8/2015 | Puschnik | B01D 53/9431 422/177 |
| 2016/0032810 A1* | 2/2016 | Denis | B01F 5/0616 60/324 |
| 2016/0160727 A1* | 6/2016 | Isada | F01N 13/017 60/301 |

* cited by examiner

US 11,149,609 B2

AFTERTREATMENT SYSTEM FOR MIXING A REDUCTANT IN AN EXHAUST GAS FLOWING THERETHROUGH

CROSS-REFERENCE TO RELATED APPLICATIONS

The present application is a National Phase Application of PCT/US2017/057624, filed Oct. 20, 2017, the contents of which are hereby incorporated by reference in their entirety.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems comprise any of several different components to reduce the levels of harmful exhaust emissions present in exhaust gas. For example, certain exhaust gas aftertreatment systems for diesel-powered IC engines comprise a selective catalytic reduction (SCR) system, including a catalyst formulated to convert NOx (NO and $NO_2$ in some fraction) into harmless nitrogen gas ($N_2$) and water vapor ($H_2O$) in the presence of ammonia ($NH_3$).

Generally in such aftertreatment systems, an exhaust reductant (e.g., a diesel exhaust fluid such as urea) is injected into the SCR system to provide a source of ammonia and mixed with the exhaust gas to partially reduce the NOx gases. The reduction byproducts of the exhaust gas are then fluidly communicated to the catalyst included in the SCR system to decompose substantially all of the NOx gases into relatively harmless byproducts that are expelled out of the aftertreatment system.

The catalytic conversion efficiency of the SCR system may depend on how efficiently the reductant is mixed with the exhaust gas flowing through the SCR system. If not mixed properly, the reductant can crystallize and form deposits on sidewalls of the exhaust conduit and/or the components of the aftertreatment system causing an increase in backpressure, clogging of the aftertreatment components, reducing the catalytic conversion efficiency of the SCR system, and increasing maintenance costs.

SUMMARY

Embodiments described herein relate generally to aftertreatment systems including features to enhance mixing of a reductant with an exhaust gas flowing therethrough. Various embodiments comprise an intake conduit having an intake conduit first sidewall defining a curvature. A second sidewall is coupled to the first sidewall and inclined at a non-zero angle with respect to a longitudinal axis of the aftertreatment system. The intake conduit first sidewall and the intake conduit second sidewall are structured to cooperatively produce an even flow split of the exhaust gas through the intake conduit internal volume.

In a first set of embodiments, an SCR system comprises at least one catalyst configured to decompose constituents of an exhaust gas flowing therethrough. The SCR system also comprises an intake conduit which defines an intake conduit internal volume structured to receive an exhaust gas. The intake conduit comprises an intake conduit first sidewall. At least a portion of the intake conduit first sidewall defines a first curvature. An intake conduit second sidewall is coupled to the intake conduit first sidewall so as to define the intake conduit. A catalyst first end of the at least one catalyst is fluidly coupled to the intake conduit internal volume through the intake conduit second sidewall. The intake conduit second sidewall is inclined at a first angle with respect to a longitudinal axis of the SCR system such that an intake conduit first end of the intake conduit receiving the exhaust gas defines an intake conduit first end cross section. Furthermore, an intake conduit second end opposite the intake conduit first end defines an intake conduit second end cross-section smaller than the intake conduit first end cross-section. An intake conduit third sidewall is positioned at the intake conduit second end. The intake conduit first sidewall and the intake conduit second sidewall are structured to cooperatively produce an even flow split of the exhaust gas through the intake conduit internal volume towards the at least one catalyst.

In another set of embodiments, an aftertreatment system comprises a decomposition tube. The decomposition tube comprises a decomposition tube first portion structured to receive an exhaust gas, and a decomposition tube second portion downstream of the decomposition tube first portion. The aftertreatment system also comprises at least one catalyst configured to decompose constituents of the exhaust gas flowing therethrough. The aftertreatment system further comprises an intake conduit downstream of the decomposition tube second portion. The intake conduit defines an intake conduit internal volume. The intake conduit comprises an intake conduit first sidewall, at least a portion of which defines a first curvature. An intake conduit second sidewall is coupled to the intake conduit first sidewall so as to define the intake conduit. A catalyst first end of the at least one catalyst is fluidly coupled to the intake conduit internal volume through the intake conduit second sidewall. The intake conduit second sidewall is inclined at a first angle with respect to a longitudinal axis of the aftertreatment system such that an intake conduit first end of the intake conduit receiving the exhaust gas defines an intake conduit first end cross section. Moreover, an intake conduit second end opposite the intake conduit first end defines an intake conduit second end cross-section smaller than the intake conduit first end cross-section. An intake conduit third sidewall is positioned at the intake conduit second end. The intake conduit first sidewall and the intake conduit second sidewall are structured to cooperatively produce an even flow split of the exhaust gas through the intake conduit internal volume.

In yet another set of embodiments, a SCR system comprises a first leg, and a second leg symmetrically positioned opposite the first leg. The first leg is structured to receive an exhaust gas first portion, and the second leg is structured to receive an exhaust gas second portion. Each of the first leg and the second leg comprise at least one catalyst configured to decompose constituents of an exhaust gas flowing therethrough. Each of the first leg and second leg further comprise an intake conduit. The intake conduit comprises an intake conduit first sidewall. At least a portion of the intake conduit first sidewall defines a first curvature. An intake conduit second sidewall is coupled to the intake conduit first sidewall so as to define the intake conduit. A catalyst first end of the at least one catalyst is fluidly coupled to the intake conduit internal volume through the intake conduit second sidewall. The intake conduit second sidewall is inclined at a first angle with respect to a longitudinal axis of the selective catalytic reduction system such that an intake conduit first end of the intake conduit receiving the exhaust gas defines an intake conduit first end cross section. Moreover, an intake conduit second end opposite the intake conduit first end defines an intake conduit second end cross-section smaller than the intake conduit first end cross-section. An intake conduit third sidewall is positioned at the intake conduit second end. The SCR system further comprises an outlet conduit defining an outlet conduit internal volume. A catalyst second end of the at least one catalyst is fluidly coupled to the outlet conduit internal volume, and structured to deliver the exhaust gas thereto. The intake conduit first sidewall and the intake conduit second sidewall are structured to cooperatively produce an even flow split of the exhaust gas through the intake conduit internal volume.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
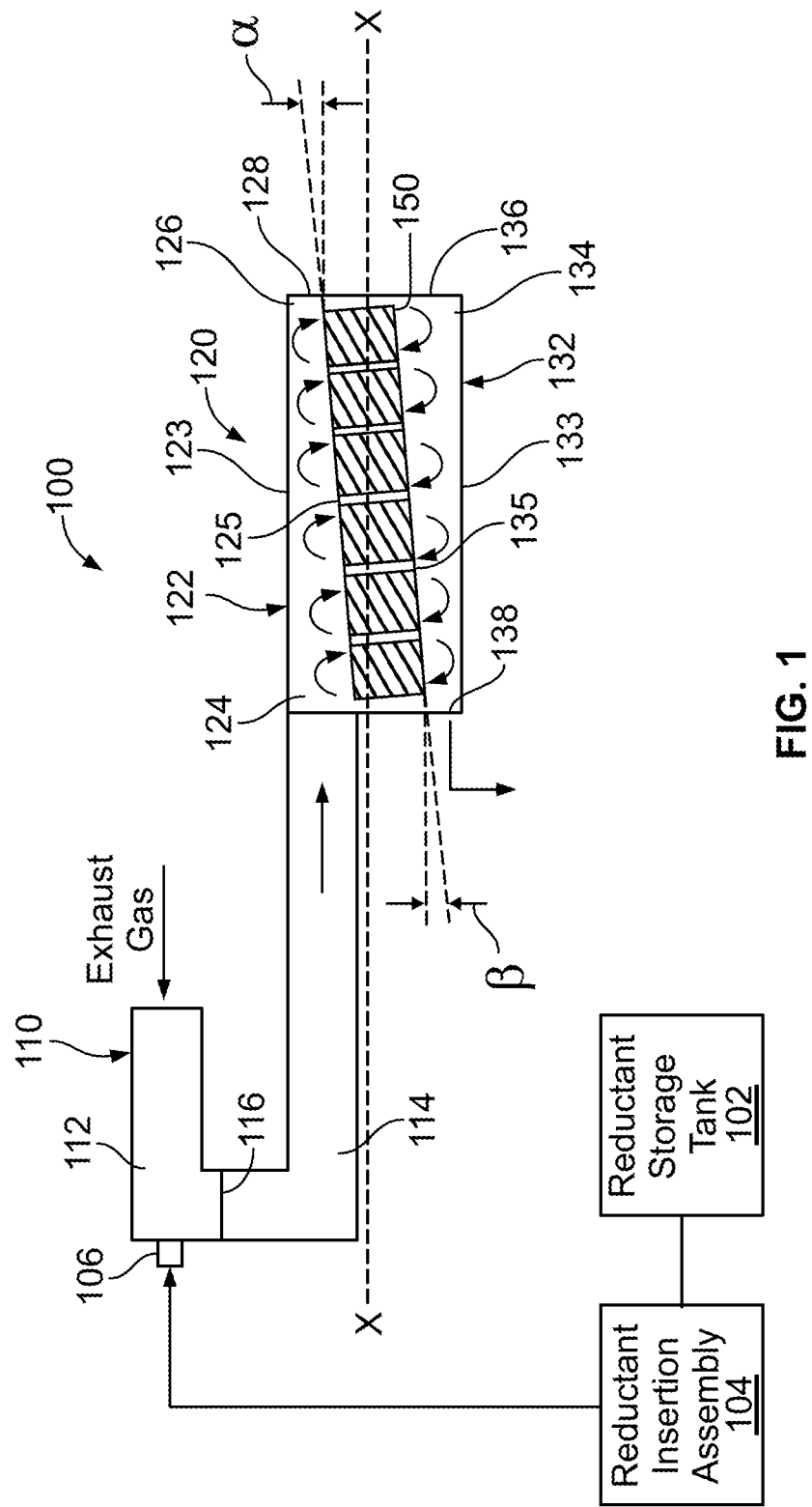
FIG. 1 is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to aftertreatment systems including features to enhance mixing of a reductant with an exhaust gas flowing therethrough. Various embodiments comprise an intake conduit having an intake conduit first sidewall defining a first curvature, a second sidewall coupled to the first sidewall and inclined at a non-zero angle with respect to a longitudinal axis of the aftertreatment system. The intake conduit first sidewall and the intake conduit second sidewall are structured to cooperatively produce an even flow split of the exhaust gas through the intake conduit internal volume.

Various embodiments of the aftertreatment systems described herein may provide benefits including, for example: (1) generating swirls in an exhaust gas flow after insertion of a reductant into the exhaust gas to enhance mixing; (2) generating swirls in the exhaust gas prior to delivery to a catalyst of an SCR system included in the aftertreatment system, thereby further enhancing mixing, providing good flow distribution and increasing a catalytic conversion efficiency of the catalyst; (3) providing even flow split of the exhaust gas, and aligning catalysts with the swirling flow path of the exhaust gas, thereby providing good flow distribution; (4) allowing thermal expansion and contraction of the catalysts within catalyst sleeves while securing the catalysts therein; and (5) providing various structures and features to accommodate thermal expansion and contraction, as well as structural loads (e.g., vibrations) on various components of the aftertreatment system.

FIG. 1 is a schematic illustration of an aftertreatment system 100, according to an embodiment. The aftertreatment system 100 is configured to receive an exhaust gas (e.g., a diesel exhaust gas) from an engine (e.g., a diesel engine, a dual fuel engine, etc.) and reduce constituents of the exhaust gas such as, for example, NOx gases, CO, hydrocarbons, etc. The aftertreatment system 100 comprises a decomposition tube 110, and an SCR system 120. In particular embodiments, the aftertreatment system 100 may also comprise a reductant storage tank 102 and a reductant insertion assembly 104.

The reductant storage tank 102 is structured to store a reductant. The reductant is formulated to facilitate decomposition of the constituents of the exhaust gas (e.g., NOx gases included in the exhaust gas) flowing through the aftertreatment system 100. Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In particular embodiments, the reductant can comprise an aqueous urea solution including 32.5% by volume of urea and 67.5% by volume of deionized water.

The reductant insertion assembly 104 is fluidly coupled to the reductant storage tank 102. The reductant insertion assembly 104 is configured to selectively insert the reductant into a decomposition tube first portion 112 of the decomposition tube 110 via an injector 106 fluidly coupled to the decomposition tube first portion 112. In other embodiments, the reductant insertion assembly 104 may be configured to insert the reductant at any other suitable location, for example into a decomposition tube second portion 114, into a mixer (not shown) positioned upstream of the SCR system 120, or directly into the SCR system 120.

For example, the reductant insertion assembly 104 may comprise one or more pumps having filter screens (e.g., to prevent solid particles of the reductant or contaminants from flowing into the pump) and/or valves (e.g., check valves) positioned upstream thereof to receive reductant from the reductant storage tank 102. In some embodiments, the pump may comprise a diaphragm pump but any other suitable pump may be used such as, for example, a centrifugal pump, a suction pump, etc.

The pump may be configured to pressurize the reductant so as to provide the reductant to the decomposition tube 110 at a predetermined pressure. Screens, check valves, pulsation dampers, or other structures may also be positioned downstream of the pump to provide the reductant to the decomposition tube 110. In various embodiments, the reductant insertion assembly 104 may also comprise a bypass line structured to provide a return path of the reductant from the pump to the reductant storage tank 102.

A valve (e.g., an orifice valve) may be provided in the bypass line. The valve may be structured to allow the reductant to pass therethrough to the reductant storage tank 102 if an operating pressure of the reductant generated by the pump exceeds a predetermined pressure so as to prevent over pressurizing of the pump, the reductant delivery lines, or other components of the reductant insertion assembly 104. In some embodiments, the bypass line may be configured to allow the return of the reductant to the reductant storage tank 102 during purging of the reductant insertion assembly 104 (e.g., after the aftertreatment system 100 is shut off).

In various embodiments, the reductant insertion assembly 104 may also comprise a blending chamber structured to receive pressurized reductant from a metering valve at a controllable rate. The blending chamber may also be structured to receive air, or any other inert gas (e.g., nitrogen), for example from an air supply unit so as to deliver a combined flow of the air and the reductant to the decomposition tube 110 through the injector 106. In various embodiments, a nozzle may be positioned in the decomposition tube 110 and structured to deliver a stream or a jet of the reductant into the decomposition tube 110.

In particular embodiments, one or more injectors 106 may be mounted on a decomposition tube first portion end of the decomposition tube first portion 112 proximal to the decomposition tube second portion 114. The injectors 106 may be operable to insert the reductant into the exhaust gas flowing through the decomposition tube first portion 112.

In one embodiment, the aftertreatment system 100 includes a plurality of injectors 106 mounted on the decomposition tube first portion end. The plurality of injectors 106 (e.g., 2, 3, 4, 5, 6 or any other suitable number of injectors) may be positioned in a radial pattern about a flow axis of the exhaust gas flowing through the decomposition tube first portion 112 and configured to insert the reductant into the exhaust gas flowing through the decomposition tube first portion 112. Insertion of reductant via the plurality of injectors 106 about the flow axis of the exhaust gas may provide better control of reductant insertion volume as well as more homogenous delivery of the reductant to the exhaust gas.

The decomposition tube 110 may have any suitable cross-section, for example circular, square, rectangular, elliptical, polygonal, etc. In particular embodiments, the decomposition tube first portion 112 and the decomposition tube second portion 114 comprise a circular cross-section. Furthermore, a ramp 116 is positioned between the decomposition tube first portion 112, and the decomposition tube second portion 114. For example, corresponding slits may be defined in sidewalls of the decomposition tube first portion 112 and the decomposition tube second portion 114 so as to form the ramp 116.

The ramp 116 restricts a flow path of the exhaust gas from the decomposition tube first portion 112 to the decomposition tube second portion 114. The circular cross-section of the decomposition tube first portion 112 and the ramp 116 cooperatively produce swirls and/or turbulence in the exhaust gas so as to increase mixing of the exhaust gas with the reductant inserted into the decomposition tube first portion 112.

In various embodiments, a NOx sensor, an oxygen sensor, a temperature sensor, a pressure sensor, or any other sensor may also be positioned in the decomposition tube 110, and/or the SCR system 120 so as to determine one or more operational parameters of the exhaust gas flowing through the aftertreatment system 100 into the SCR system 120, or flowing out of the SCR system 120.

The SCR system 120 comprises at least one catalyst 150, and an intake conduit 122. In some embodiments, the SCR system 120 may also comprise and outlet conduit 132. The SCR system 120 is positioned downstream of the decomposition tube second portion 114 and fluidly coupled thereto. The catalyst 150 included in the SCR system 120 is formulated to decompose constituents of an exhaust gas, for example NOx gases, flowing through the SCR system 120.

The catalyst 150 comprises any suitable catalyst material such as, for example, platinum, palladium, rhodium, cerium, iron, manganese, copper, vanadium based catalyst, any other suitable catalyst, or a combination thereof. The catalyst material can be disposed on a suitable substrate such as, for example, a ceramic (e.g., cordierite) or metallic (e.g., kanthal) monolith core which can, for example, define a honeycomb structure. A washcoat can also be used as a carrier material for the catalyst material. Such washcoat materials may comprise, for example, aluminum oxide, titanium dioxide, silicon dioxide, any other suitable washcoat material, or a combination thereof. The exhaust gas (e.g., diesel exhaust gas) can flow over and/or about the catalyst 150 such that any NOx gases included in the exhaust gas are further reduced to yield an exhaust gas which is substantially free of NOx gases.

The aftertreatment system 100 or the SCR system 120 included therein may also comprise other components for removing particulate matter or reducing constituents of the exhaust gas. For example, in some embodiments, the aftertreatment system 100 may comprise a filter (not shown) positioned upstream of the SCR system 120, and structured to remove particulate matter (e.g., carbon particles, soot, dust, etc.) included in the exhaust gas. In such embodiments, the aftertreatment system 100 may also include particulate sensor (e.g., positioned downstream of the SCR system 120) to determine an amount of particulate matter included in the exhaust gas exiting the SCR system 120.

In other embodiments, the aftertreatment system 100 may also comprise an oxidation catalyst (not shown) which may be formulated to decompose at least a fraction of NO in the exhaust gas to $NO_2$. The oxidation catalyst may be positioned upstream of the SCR system 120, for example downstream of the filter and upstream of the intake conduit 122, or included in the catalyst 150.

The intake conduit 122 defines an intake conduit internal volume structured to receive the exhaust gas from the decomposition tube second portion 114. As shown in FIG. 1, the intake conduit 122 comprises an intake conduit first sidewall 123. At least a portion of the intake conduit first sidewall 123 defines a first curvature. For example, a portion of the intake conduit first sidewall 123 may be semi-circular.

In some embodiments, the intake conduit first sidewall 123 may facilitate maintenance and/or generation of swirling flow in the exhaust gas flowing therethrough towards the at least one catalyst 150 included in the SCR system 120, so as to enhance mixing of the reductant with the exhaust gas For example, the intake conduit first sidewall 123 may facilitate maintenance of the swirling flow in the exhaust gas produced in the decomposition tube 110, as described before herein.

In particular embodiments, a plurality of first ridges are defined on at least the portion of the intake conduit first sidewall 123 defining the first curvature. The plurality of first ridges may facilitate generation of and/or maintenance of the swirling flow in the exhaust gas (e.g., generated by the decomposition tube 110) and/or serve as structural ribs for increasing a rigidity of the intake conduit first sidewall 123.

The intake conduit 122 also comprises an intake conduit second sidewall 125 coupled to the intake conduit first sidewall 123 so as to define the intake conduit 122. The intake conduit second sidewall 125 is inclined at a first angle $\alpha$ with respect to a longitudinal axis X-X of the SCR system 120. The first angle $\alpha$ may include any suitable angle, for example, 5, 10, 15, 20, 25, 30 degrees or any other suitable value or range therebetween. The inclination of the intake conduit second sidewall 125 causes an intake conduit first end 124 of the intake conduit 122 receiving the exhaust gas to define an intake conduit first end cross-section. The intake conduit first sidewall 123 and the intake conduit second sidewall 125 are structured to cooperatively produce an even flow split of the exhaust gas through the intake conduit internal volume, as described below in detail herein.

Furthermore, an intake conduit second end 126 opposite the intake conduit first end 124 defines an intake conduit second end cross-section which is smaller than the intake conduit first end cross-section. In other words, the intake conduit 122 is tapered, thereby defining a variable cross-section which decreases from the intake conduit first end 124, which serves as inlet for the exhaust gas, to the intake conduit second end 126. An intake conduit third sidewall 128 is positioned on the intake conduit second end 126, so as to seal the intake conduit second end 126.

In various embodiments, an intake conduit flange (not shown) may be fluidly coupled to the intake conduit first end 124. In such embodiments, an intake conduit sleeve may be positioned on the intake conduit first sidewall 123 proximal to the intake conduit first end 124. The intake conduit sleeve may have an intake conduit sleeve thickness greater than an intake conduit first sidewall thickness of the intake conduit first sidewall 123. The intake conduit sleeve may comprise an intake conduit sleeve first portion positioned on the at least a portion of the intake conduit first sidewall 123 defining the first curvature. An intake conduit sleeve second portion may be positioned on a flat portion of the intake conduit first sidewall 123.

Furthermore, an intake conduit sleeve third portion may axially extend from the intake conduit sleeve first portion towards the intake conduit flange, and may include an intake conduit sleeve third portion end curving towards the intake conduit flange. The intake conduit sleeve may provide structural reinforcement at the intake conduit first end 124, for example to prevent failure or cracking due to thermal expansion because of the larger intake conduit sleeve thickness, and by eliminating need for holes and welds.

A catalyst first end of the at least one catalyst 150 is fluidly coupled to the intake conduit internal volume through the intake conduit second sidewall 125. For example, the SCR system 120 may comprise a plurality of catalysts 150. A plurality of openings may be defined in the intake conduit second sidewall 125. The catalyst first end of each of the plurality of catalysts 150 may be fluidly coupled to a corresponding opening of the plurality of openings defined in the intake conduit second sidewall 125. The catalyst 150 may be positioned such that a catalyst axial flow path of each of the plurality of catalysts 150 is normal to the first angle $\alpha$ of inclination of the intake conduit second sidewall 125.

In other embodiments, the SCR system 120 may also comprise an outlet conduit 132 defining an outlet conduit internal volume. A catalyst second end of the at least one catalyst 150 opposite the catalyst first end is fluidly coupled to the outlet conduit internal volume and structured to deliver the exhaust gas thereto.

In particular embodiments, the SCR system 120 may also comprise at least one catalyst sleeve coupling the intake conduit 122 to the outlet conduit 132. In such embodiments, each of the at least one catalyst 150 may be positioned within a corresponding catalyst sleeve. In various embodiments, at least one sleeve ramp may be positioned on a catalyst sleeve inner sidewall of the catalyst sleeve. The at least one sleeve ramp may be structured to center a catalyst axial flow path of the at least one catalyst 150 to an exhaust gas axial flow path within the corresponding catalyst sleeve.

Furthermore, a securing mechanism may be positioned on the at least on catalyst sleeve, and configured to selectively secure the at least one catalyst 150 within the at least one catalyst sleeve. In one embodiment, the securing mechanism may comprise at least one jacking bolt having a ball end. The ball end of the at least one jacking bolt may protrude through the catalyst sleeve inner sidewall. The at least one jacking bolt is structured to be engaged so as to urge the ball end thereof towards the at least one catalyst 150, thereby securing the at least one catalyst 150 within the corresponding catalyst sleeve.

In some embodiments, the outlet conduit 132 comprises an outlet conduit first sidewall 133. In particular embodiments, at least a portion of the outlet conduit first sidewall 133 may define a second curvature, which may be the same as, or different from the first curvature of the intake conduit first sidewall 123. In particular embodiments, a plurality of second ridges may also be defined on at least a portion of the outlet conduit first sidewall 133, for example to serve as structural ribs, increasing a structural integrity of the outlet conduit first sidewall 133.

The outlet conduit 132 further comprises an outlet conduit second sidewall 135 coupled to the outlet conduit first sidewall 133 so as to define the outlet conduit 132. The catalyst second end of the at least one catalyst 150 is coupled to the outlet conduit internal volume through the outlet conduit second sidewall 135.

The outlet conduit second sidewall 135 is inclined at a second angle β with respect to the longitudinal axis X-X of the SCR system 120, such that an outlet conduit first end 134 of the outlet conduit 132 proximal to the intake conduit second end 126 defines an outlet conduit first end cross-section. Furthermore, an outlet conduit second end opposite the outlet conduit first end 134 defines an outlet conduit second end cross-section smaller than the outlet conduit first end cross-section.

The second angle β may include any suitable inclination angle, for example 5, 10, 15, 20, 25, 30 degrees or any other suitable value or range therebetween. In particular embodiments, the second angle β may be equal to the first angle α of the intake conduit second sidewall 125. In this manner, the outlet conduit 132 may also be tapered, thereby defining a variable cross-section which decreases from the outlet conduit first end 134 to the outlet conduit second end. Moreover, the at least one catalyst 150 is positioned such that the catalyst axial flow path is also normal to the second angle β of inclination of the outlet conduit second sidewall 135.

An outlet conduit third sidewall 136 is positioned at the outlet conduit first end 134 so as to seal the outlet conduit first end 134. The outlet conduit 132 may also define one or more outlet conduit openings 138 to allow the exhaust gas to exit therefrom. Exhaust tubes may be fluidly coupled to the one or more outlet conduit openings 138, for allowing the exhaust gas to exit the outlet conduit 132.

As described before, the ramp 116 generates a swirling flow in the exhaust gas flowing towards the intake conduit 122 to enhance mixing of the reductant with exhaust gas as it is delivered to the at least one catalyst 150. The tapered cross-section of the intake conduit 122 produced cooperatively by the intake conduit first sidewall 123 and the intake conduit second sidewall 125 may enable an even mass flow split or distribution of the exhaust gas flowing through the intake conduit internal volume by maintaining a constant ratio between the plurality of catalysts 150 and a volumetric flow rate of the exhaust gas. This may also ensure that a velocity of the exhaust gas as it flows through the intake conduit 122 remains constant.

As shown in FIG. 1, a plurality of catalysts 150 are fluidly coupled to the intake conduit 122 from the intake conduit first end 124 to the intake conduit second end 126 via the intake conduit second sidewall 125. As exhaust gas flows through the intake conduit 122, at least a portion the exhaust gas encounters the catalysts 150 positioned proximal to the intake conduit first end 124, and flows therein. This may cause uneven distribution of the exhaust gas to the catalysts 150 positioned downstream of the intake conduit first end 124. However, by reducing the cross-section of the intake conduit 122 as described herein, the velocity of the exhaust gas is maintained, thereby creating a more homogenous distribution of the exhaust gas to each of the plurality of catalysts 150.

Moreover, the outlet conduit 132 also defines a tapered cross-section, reducing from a larger outlet conduit first end cross-section proximal to the intake conduit second end 126, to a smaller outlet conduit second end cross-section proximal to the intake conduit first end 124. The variable cross-section of the outlet conduit 132 may also facilitate homogenous distribution of the exhaust gas through each of the plurality of catalysts 150.

For example, as the exhaust gas enters the intake conduit first end 124 at a high velocity, a momentum of the exhaust gas may try to carry the exhaust gas towards the intake conduit second end 126. However, the larger outlet conduit second end cross-section proximal to the intake conduit first end 124 may create a low pressure zone within the outlet conduit internal volume proximal to the outlet conduit second end. This may overcome the momentum of the exhaust gas at the intake conduit first end 124, thereby urging at least a portion of the exhaust gas to flow through the catalysts 150 positioned proximal to the intake conduit first end 124.

Furthermore, the larger cross-section at the outlet conduit first end 134 may facilitate the smaller mass flow of the exhaust at the intake conduit second end 126, to flow therein through the catalysts 150 positioned proximal to the intake conduit second end 126. In this manner, the mass flow of the exhaust gas between the intake conduit first end 124 and the intake conduit second end 126 may be evenly split.

Figure 2:
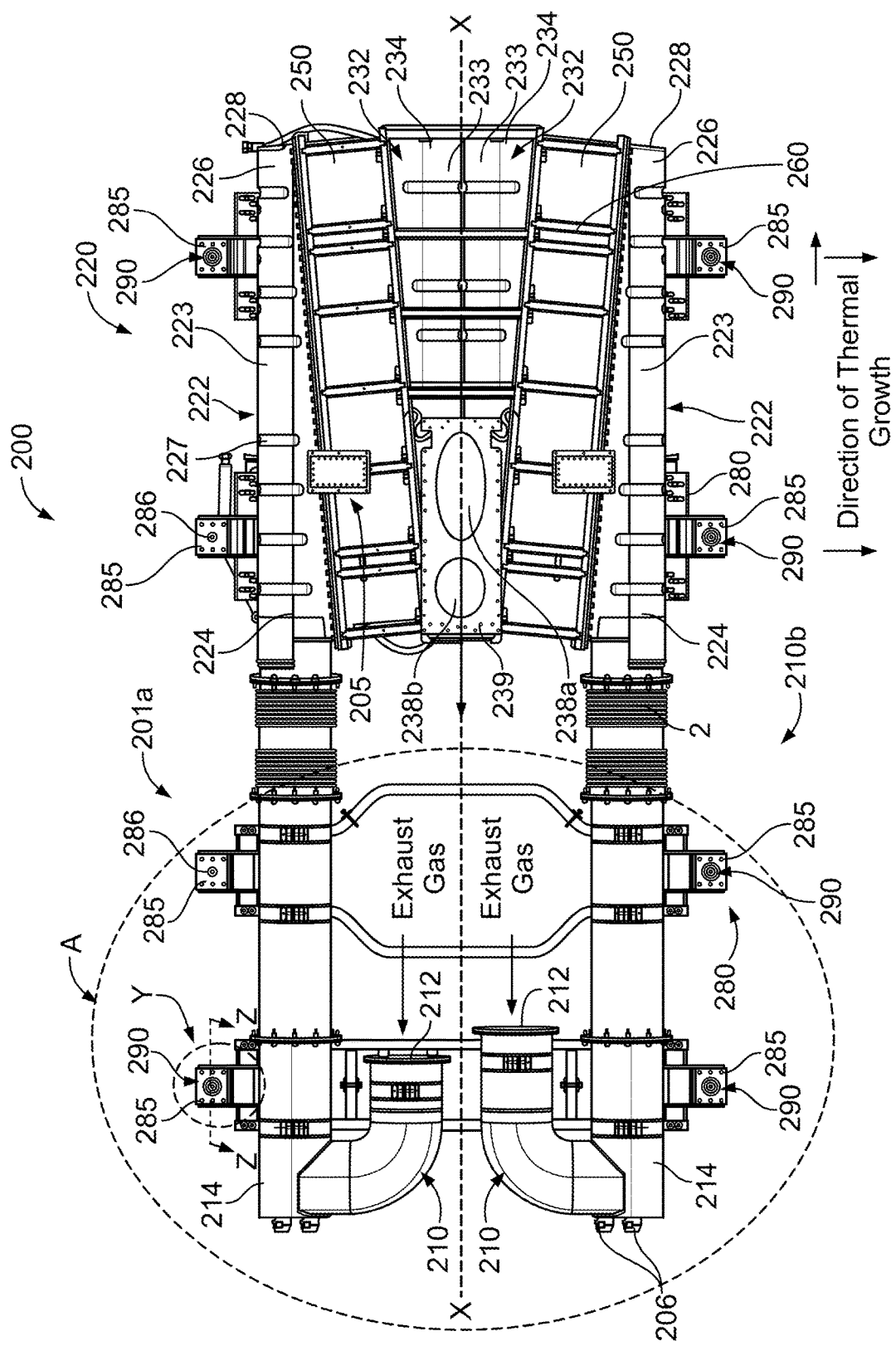
FIG. 2 is a top view of an aftertreatment system according to another embodiment.

FIG. 2 is a top view of an aftertreatment system 200, according to another embodiment. The aftertreatment system 200 is configured to receive an exhaust gas (e.g., a diesel exhaust gas) from an engine (e.g., a diesel engine, a dual fuel engine, etc.) and reduce constituents of the exhaust gas such as, for example, NOx gases, CO, hydrocarbons, etc. The aftertreatment system 200 comprises a first leg 201a, and a second leg 201b symmetrically positioned opposite the first leg 201a. In other words, the first leg 201a and the second leg 201*b* may include substantially the same components. The first leg 201*a* is structured to receive an exhaust gas first portion and the second leg 201*b* is structured to receive an exhaust gas second portion.

It is to be understood that each of the components described below herein with reference to the aftertreatment system 200 are included in each of the first leg 201*a* and the second leg 201*b* of the aftertreatment system 200, unless otherwise stated. The aftertreatment system 200 comprises a decomposition tube 210, and a SCR system 220. Symmetric portions of the SCR system 220 are included in each of the first leg 201*a* and the second leg 201*b*. The aftertreatment system 200 may also include any other component such as, for example a reductant storage tank, a reductant insertion assembly, a filter, an oxidation catalyst or any other component as described with respect to the aftertreatment system 100.

Figure 3:
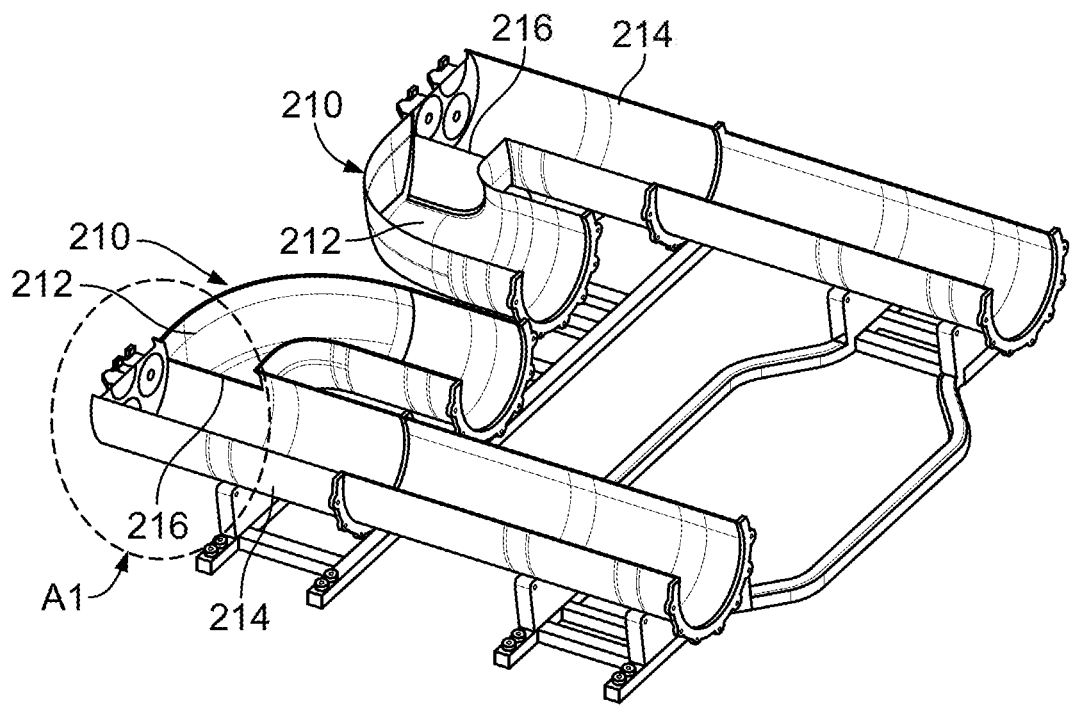
FIG. 3 is a top-rear cross-section view of a decomposition tube included in the aftertreatment system in a portion thereof, as indicated by the arrow A in FIG. 2
Figure 4:
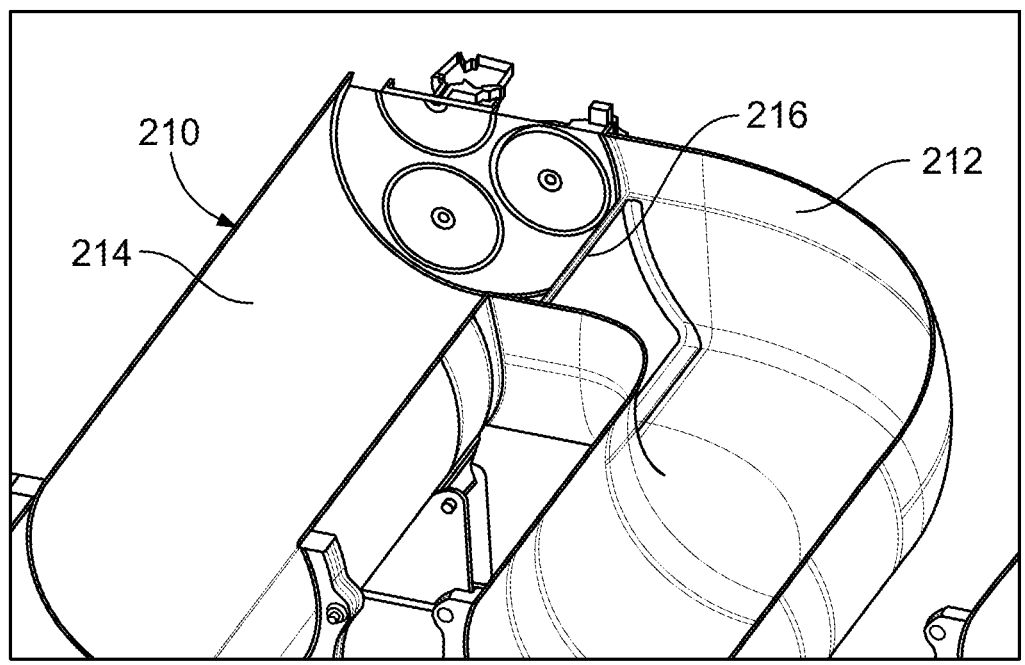
FIG. 4 is a top-front cross-section view of a portion of the decomposition tube of FIG. 3, as indicated by the arrow A1 in FIG. 3.

The decomposition tube 210 comprises a decomposition tube first portion 212 and a decomposition tube second portion 214. FIG. 3 is a top-rear cross-section view of a decomposition tube 210 as indicated by the arrow A in FIG. 2. FIG. 4 is a top-front cross-section view of a portion of the decomposition tube 210 indicated by the arrow A1 in FIG. 3. As shown in FIGS. 3 and 4, the decomposition tube 210 is has a circular cross-section. A ramp 216 is positioned between the decomposition tube first portion 212 and the decomposition tube second portion 214, such that the ramp 216 defines a tangential opening near the top of the, decomposition tube first portion 212 leading into the decomposition tube second portion 214.

The ramp 216 restricts a flow path of the exhaust gas from the decomposition tube first portion 212 to the decomposition tube second portion 214. The circular cross-section of the decomposition tube 210 and the ramp 216 cooperatively produce swirls and/or turbulence in the exhaust gas so as to increase mixing and evaporation of the reductant inserted into the exhaust gas in the decomposition tube first portion 212.

In particular embodiments, one or more injectors 206 may be mounted on a decomposition tube first portion end of the decomposition tube first portion 212 proximal to the decomposition tube second portion 214, and operable to insert the reductant into the exhaust gas flowing through the decomposition tube first portion 212.

Figure 5:
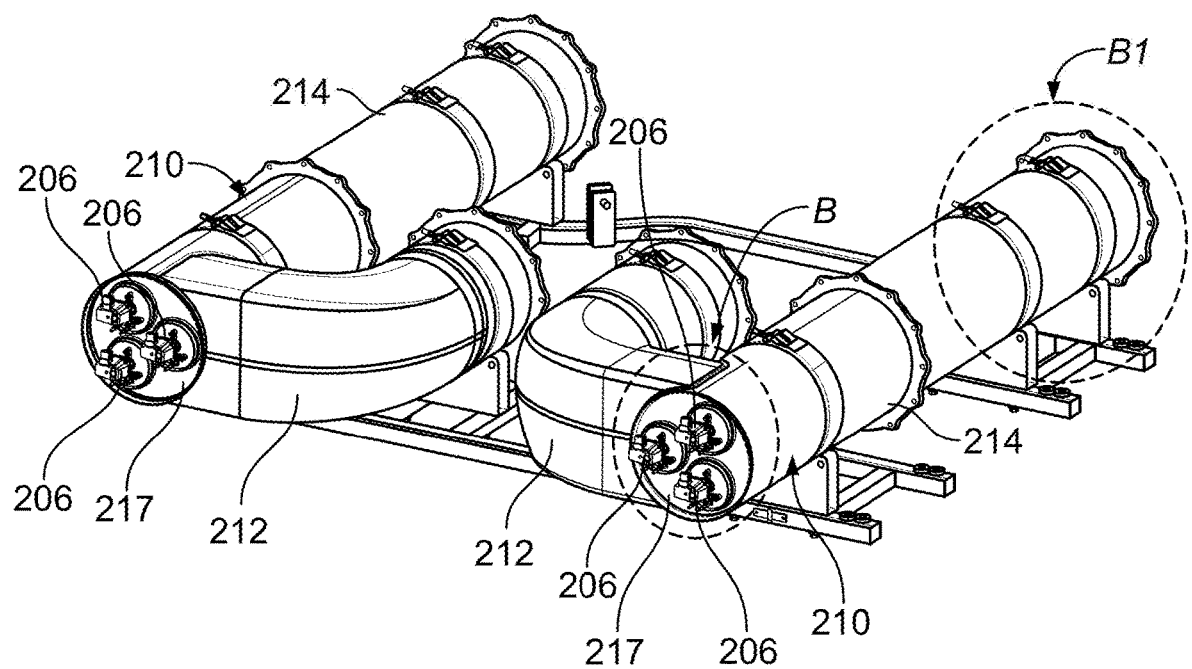
FIG. 5 is a front perspective view of the decomposition tube included in the aftertreatment system of FIG. 2.
Figure 6:
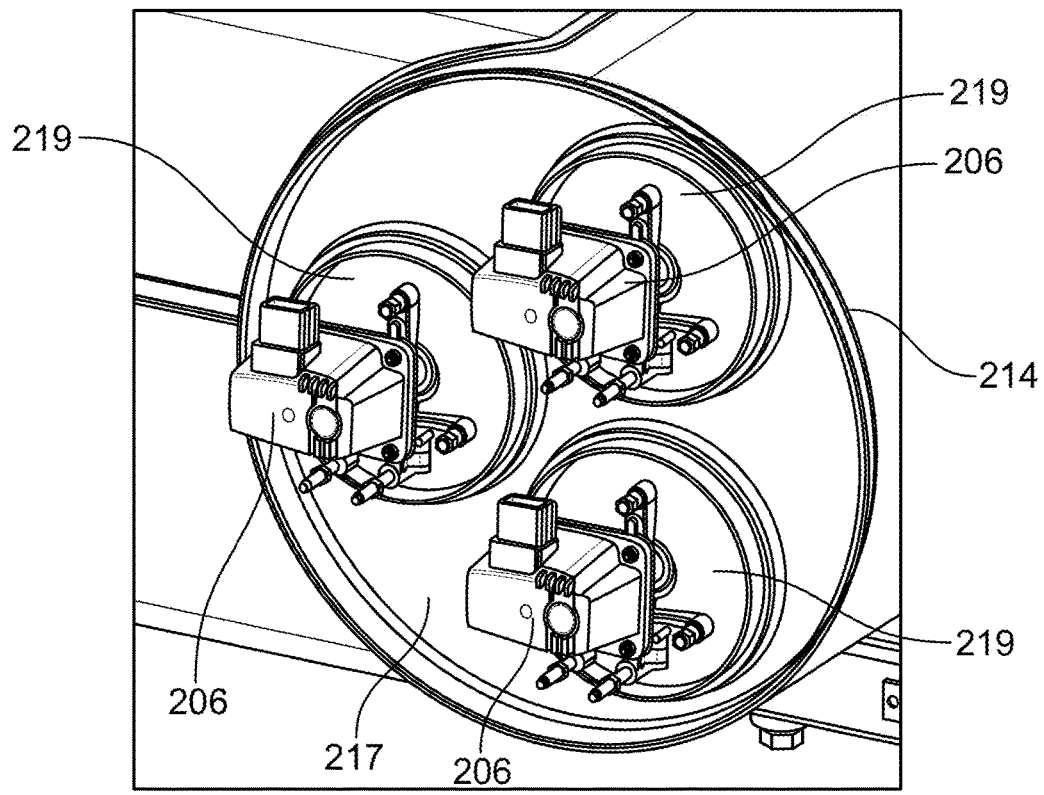
FIG. 6 is a front perspective view of a portion of the decomposition tube of FIG. 5, as indicated by the arrow B in FIG. 5.

FIG. 5 is a front perspective view of the decomposition tube 210, and FIG. 6 is a front perspective view of a portion of the decomposition tube 210 indicated by the arrow B in FIG. 5. As shown in FIGS. 5-6, a plurality of injectors 206 are mounted on the decomposition tube first portion end. While shown as including three injectors 206, any suitable number of injectors 206 may be mounted on the decomposition tube first portion end (e.g., 2, 4, 5, 6 or any other suitable number of injectors).

The plurality of injectors 206 are positioned in a radial pattern about a flow axis of the exhaust gas flowing through the decomposition tube first portion 212 and configured to insert the reductant into the exhaust gas flowing through the decomposition tube first portion 212. Insertion of reductant via the plurality of injectors 206 about the flow axis of the exhaust gas may provide better control of reductant insertion volume, help achieve a desired flow rate of reductant, as well as provide more homogenous delivery and mixing of the reductant with the exhaust gas.

Various features maybe provided on the decomposition tube 210 to reduce heat transfer therefrom so as to maintain a temperature of the exhaust gas delivered to the SCR system 220 and/or protect the plurality of injectors 206 from exposure to the high temperature of the exhaust gas. In one embodiment, as shown in FIG. 5, a thermal isolator plate 219 may be positioned on the decomposition tube first portion end below each of the plurality of injectors 206. The thermal isolator plate 219 may provide thermal isolation of a corresponding injector 206, thereby protecting the corresponding injector 206 from being exposed to too high a temperature gradient. The thermal isolator plate 219 may be formed from any suitable thermal insulating material, for example, ceramics, wood, graphite, fiber glass, cellulose, polyurethane, rubber, etc.

Figure 7:
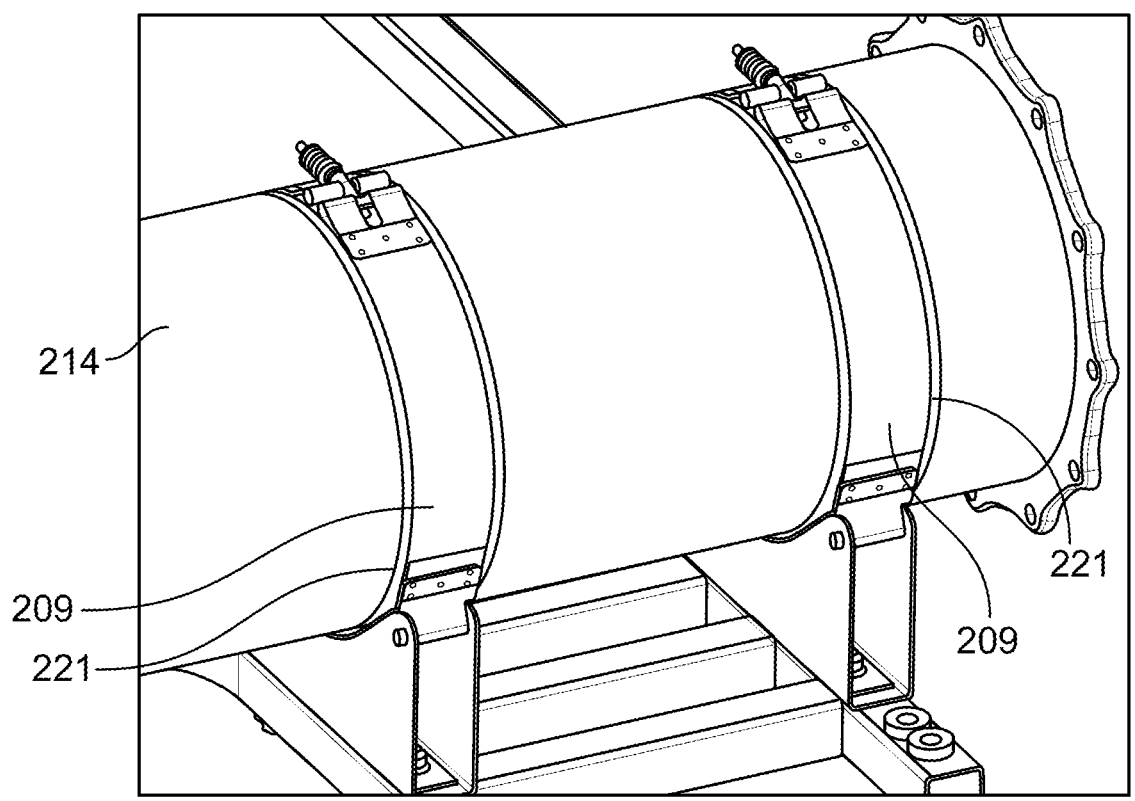
FIG. 7 is a front perspective view of a portion of the decomposition tube of FIG. 5, as indicated by the arrow B1 in FIG. 5.

FIG. 7 is a front perspective view of a portion of the decomposition tube 210 indicated by the arrow B1 in FIG. 5. A plurality of bands 209 (e.g., metal bands) are positioned around the decomposition tube second portion 214. The plurality of bands 209 may be structured to support the decomposition tube second portion 214, or any other portion of the decomposition tube 210 (e.g., the decomposition tube first portion 212). The plurality of bands 209 are exposed to an environment external to the decomposition tube 210 and therefore, may have a temperature significantly lower than a temperature of the decomposition tube second portion 214 having the hot exhaust gas flowing therethrough.

Because of the temperature difference between the decomposition tube second portion 214 and the plurality of bands 209, the interface between the decomposition tube second portion 214 where each of the plurality of bands 209 contact an outer surface of the decomposition tube second portion 214, may serve as a portion of lower temperature relative to the temperature of the exhaust gas, thereby providing a heat sink. This may cause cool spots in the decomposition tube second portion 214 at these interfaces. These cool spots are detrimental to the operation of the aftertreatment system 200, as they may cause reductant deposits to form and build up near the cool spots on an internal sidewall of the decomposition tube second portion 214 and/or the decomposition tube first portion 212.

To prevent such cool spots, a thermal isolation strip 221 is interposed between an outer surface of the decomposition tube second portion 214 (and/or the decomposition tube first portion 212) and the corresponding band 209 of the plurality of bands 209. The thermal isolation strip 221 may be formed from any suitable thermal insulating material, for example, ceramics, wood, graphite, fiber glass, cellulose, polyurethane, etc., and serve to prevent heat loss from the interface between each of the plurality of bands 209, and the decomposition tube second portion 214 and/or the decomposition tube first portion 212.

In various embodiments, a NOx sensor, an oxygen sensor, a temperature sensor, a pressure sensor, or any other sensor may also be positioned in the decomposition tube 210 so as to determine one or more operational parameters of the exhaust gas flowing through the decomposition tube 210 into the SCR system 220.

Figure 8:
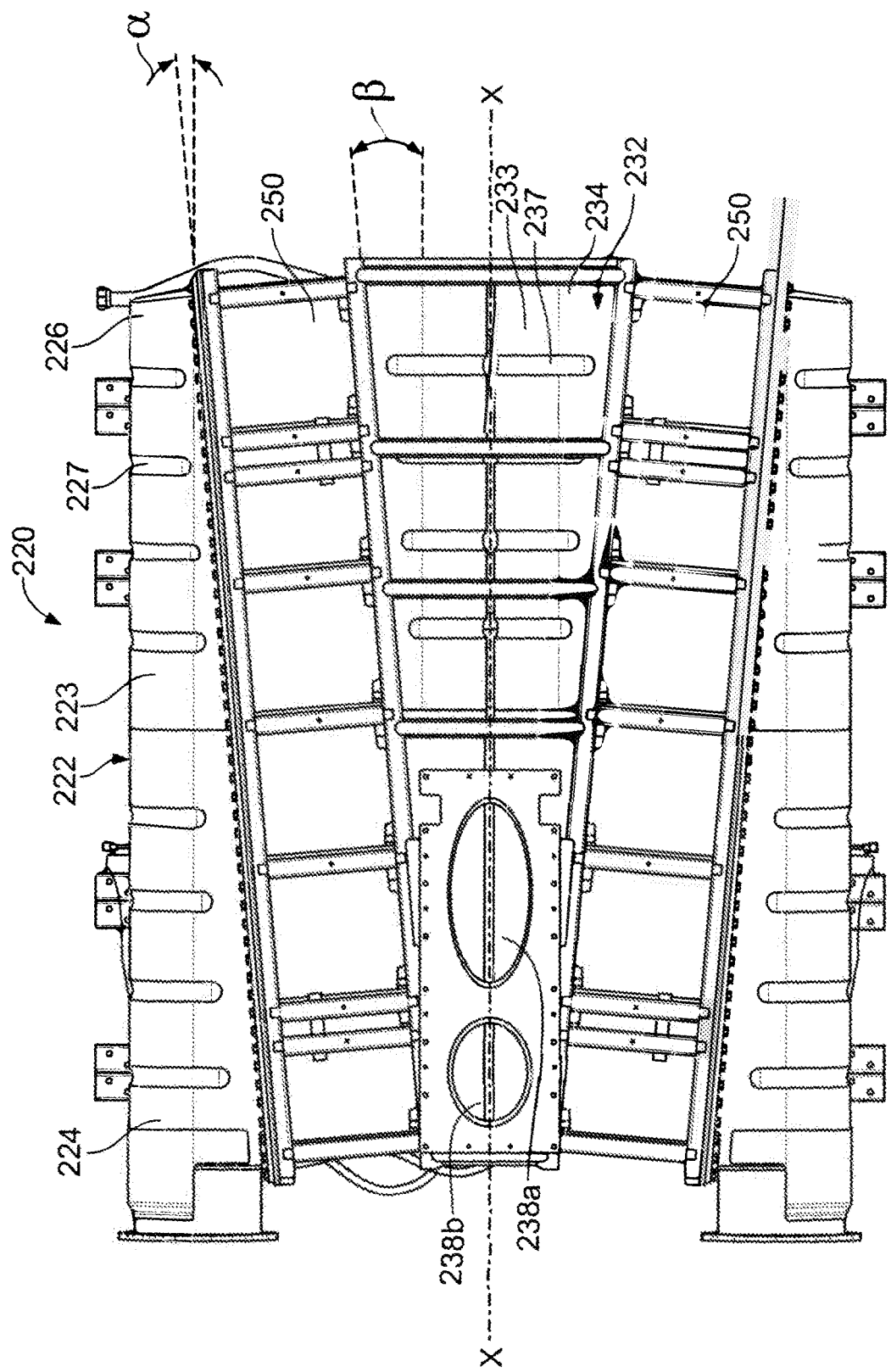
FIG. 8 is a top view of an SCR system included in the aftertreatment system of FIG. 2, according to particular embodiment.
Figure 9:
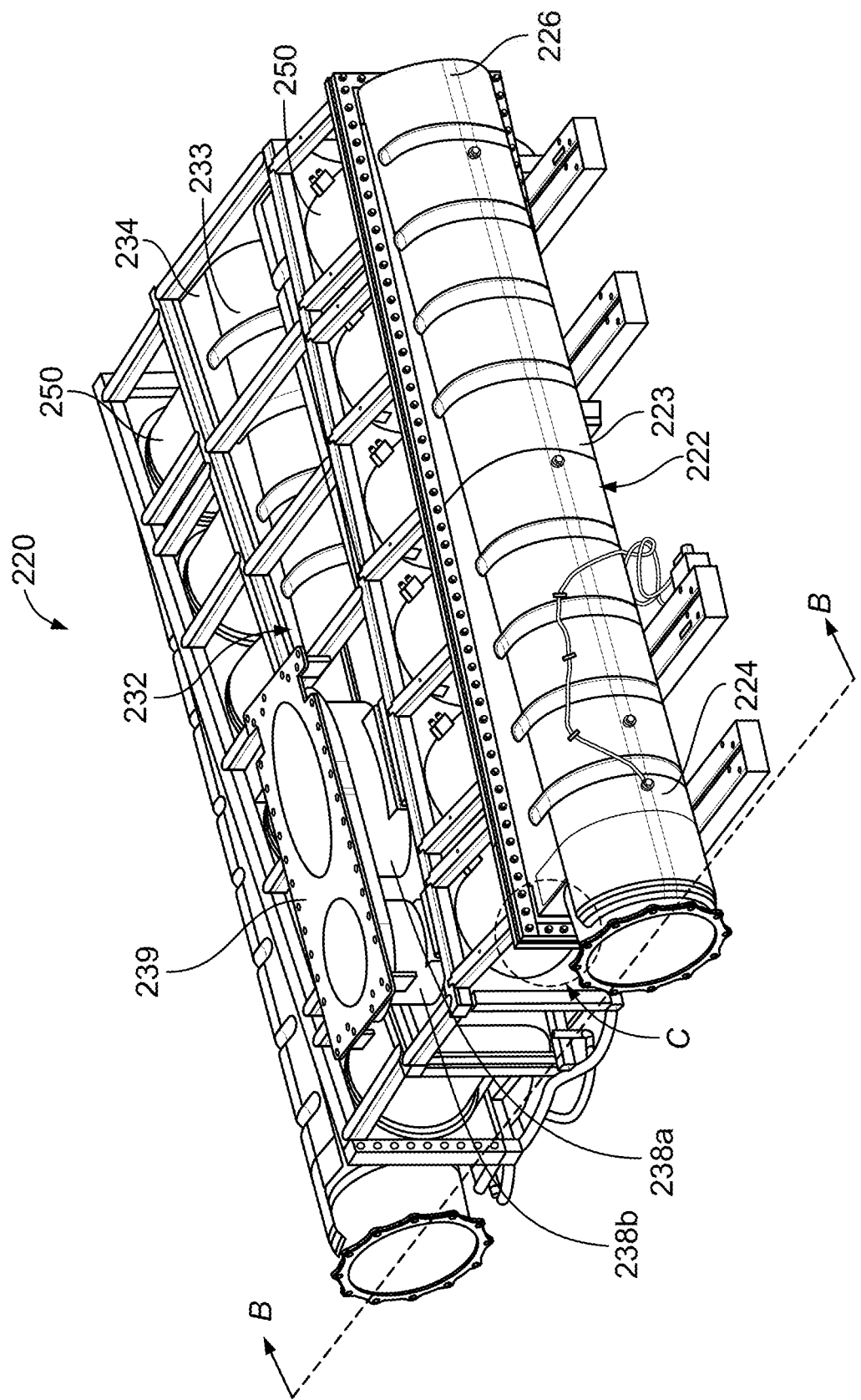
FIG. 9 is a top perspective view of the SCR system of FIG. 8.

FIG. 8 is a top view of an SCR system 220, and FIG. 9 is a front perspective thereof. The SCR system 220 also includes an SCR system first leg included in the first leg 201*a*, and an SCR system second leg included in the second leg 201*b* of the aftertreatment system 200. The SCR system first leg and the SCR system second leg are structured to receive the exhaust gas first portion and the exhaust gas second portion respectively, and are substantially similar to each other.

Figure 10:
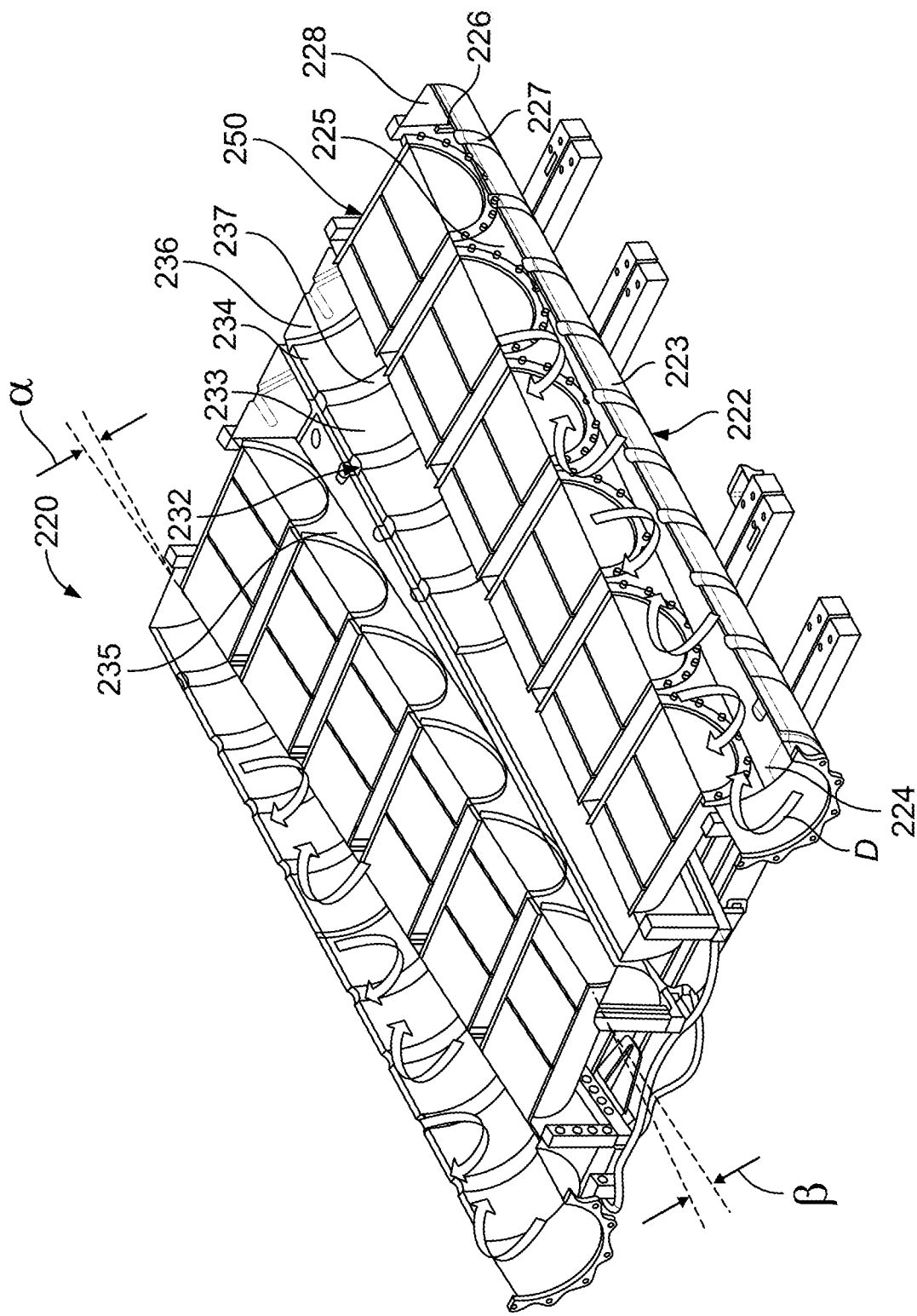
FIG. 10 is a cross-section view of the SCR system of FIG. 8, taken along the line B-B as shown in FIG. 9.

FIG. 10 is a cross-section view of the SCR system 220 taken along the line B-B shown in FIG. 9. As shown in FIGS. 8-10, the SCR system 220 comprises a plurality of catalysts 250, an intake conduit 222 and an outlet conduit 232. The intake conduit 222 is positioned downstream of the decomposition tube second portion 214 and fluidly coupled thereto. In particular embodiments, flexible hosing 2 (e.g., wire mesh hosing or bellowed tubes) may be used to couple the decomposition tube second portion 214 to the intake conduit 222, as shown in FIG. 2. The flexible hosing 2 may accommodate slight misalignments between the decomposition tube second portion 214 and the intake conduit 222, as well as allow for slight vibrations and movements of the SCR system 220 relative to the decomposition tube 210 during operation of a vehicle or equipment on which the aftertreatment system 200 is mounted.

The catalyst 250 included in the SCR system 220 is formulated to decompose constituents of an exhaust gas, for example NOx gases, flowing through the SCR system 220. Any suitable catalyst can be used such as, for example as described with respect to the catalyst 150 included in the aftertreatment system 100.

The intake conduit 222 defines an intake conduit internal volume structured to receive the exhaust gas from the decomposition tube second portion 214. As shown in FIG. 10, the intake conduit 222 comprises an intake conduit first sidewall 223. At least a portion of the intake conduit first sidewall 223 defines a first curvature. For example, as shown in FIG. 10, a portion of the intake conduit first sidewall 223 is semi-circular.

In some embodiments, the intake conduit first sidewall 223 may facilitate maintenance and/or generation of the swirling flow in the exhaust gas flowing therethrough towards the at least one catalyst 250 included in the SCR system 220, as shown by the arrow D in FIG. 10 For example, the intake conduit first sidewall 223 may facilitate maintenance of the swirling flow in the exhaust gas produced in the decomposition tube 210, as described before herein. The swirling flow enhances mixing of the reductant with the exhaust gas, as described previously in detail with respect to the SCR system 120.

A plurality of first ridges 227 are defined on at least the portion of the intake conduit first sidewall 223 defining the first curvature. The plurality of first ridges 227 may facilitate maintenance and/or generation of the swirling flow in the exhaust gas and/or serve as structural ribs for increasing a rigidity of the intake conduit first sidewall 223.

The intake conduit 222 also comprises an intake conduit second sidewall 225 coupled to the intake conduit first sidewall 223 so as to define the intake conduit 222. The intake conduit second sidewall 225 is inclined at a first angle α with respect to a longitudinal axis X-X of the SCR system 220. The first angle α may include any suitable angle, for example, 5, 10, 15, 20, 25, 30 degrees or any other suitable value or range therebetween. The inclination of the intake conduit second sidewall 225 causes an intake conduit first end 224 of the intake conduit 222 receiving the exhaust gas to define an intake conduit first end cross-section.

Furthermore, an intake conduit second end 226 opposite the intake conduit first end 224 defines an intake conduit second end cross-section which is smaller than the intake conduit first end cross-section. In other words, the intake conduit 222 is tapered, thereby defining a variable cross-section which decreases from the intake conduit first end 224 which serves as inlet for the intake conduit 222, to the intake conduit second end 226. The intake conduit first sidewall 223 and the intake conduit second sidewall 225 are structured to cooperatively produce an even flow split of the exhaust gas through the intake conduit internal volume. An intake conduit third sidewall 228 is positioned on the intake conduit second end 226, so as to seal the intake conduit second end 226.

Figure 11:
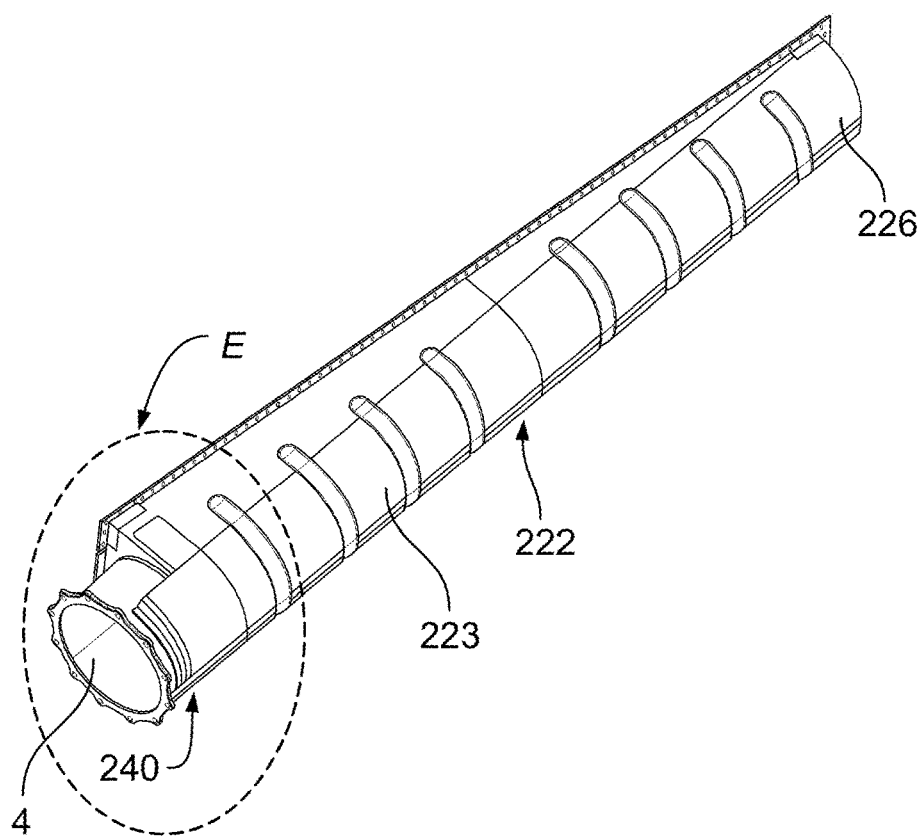
FIG. 11 is a top perspective view of an intake conduit included in the SCR system of FIG. 8.
Figure 12:
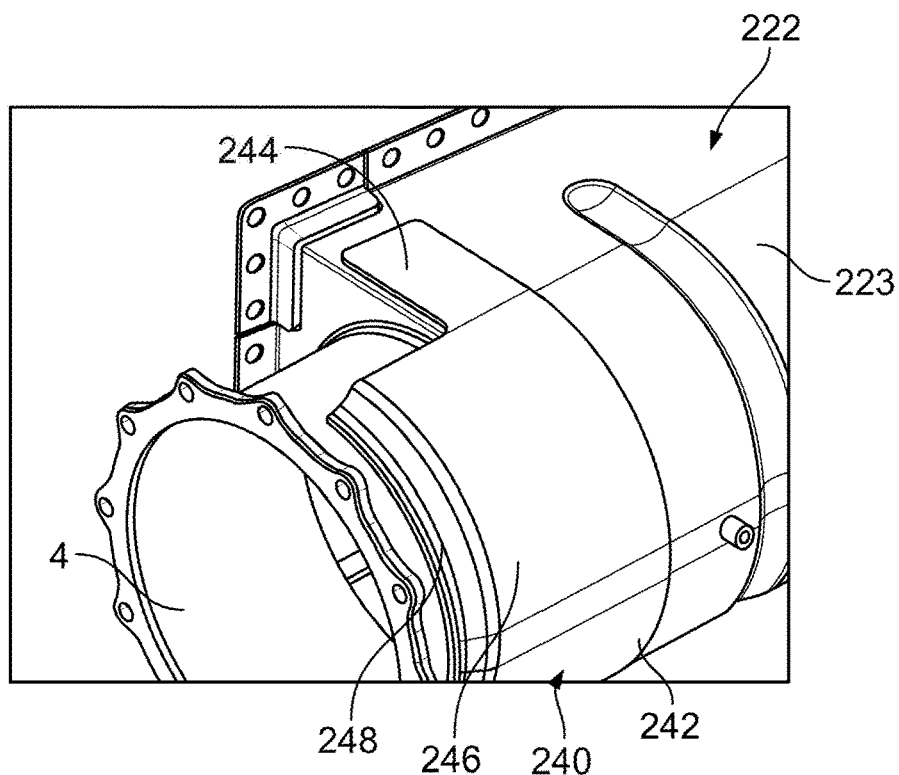
FIG. 12 is a top perspective view of a portion of the intake conduit of FIG. 11, as indicated by the arrow E in FIG. 11.

FIG. 11 is a top perspective view of an intake conduit 222 included in the SCR system second leg of the SCR system 220. FIG. 12 is a top perspective view of a portion of the intake conduit 222 indicated by the arrow E in FIG. 11. As shown in FIGS. 11-12, an intake conduit flange 4 is fluidly coupled to the intake conduit first end 224. The intake conduit flange 4 may be used to couple the intake conduit first end 224 to the decomposition tube second portion 214 via the flexible hosing 2. The intake conduit flange 4 may be welded to a rim of the intake conduit inlet defined at the intake conduit first end 224.

The corner of the intake conduit first end 224 where the intake conduit flange 4 interfaces with the intake conduit first end 224 may be a particularly vulnerable location for thermal expansion failures. To prevent such failures, an intake conduit sleeve 240 is positioned on the intake conduit first sidewall 223 proximal to the intake conduit first end 224.

The intake conduit sleeve 240 may have an intake conduit sleeve thickness greater than an intake conduit first sidewall thickness of the intake conduit first sidewall 223. The intake conduit sleeve 240 comprises an intake conduit sleeve first portion 242 positioned on the at least a portion of the intake conduit first sidewall 223 defining the first curvature. For example, the intake conduit sleeve first portion 242 may have an intake conduit sleeve first portion curvature which is substantially the same as the first curvature of the intake conduit first sidewall 223. Moreover, the intake conduit sleeve first portion 242 may have an intake conduit sleeve first portion radius which intersects with an intake conduit first sidewall radius of the intake conduit first sidewall 223.

This may allow the intake conduit sleeve first portion 242 to provide an interference-fit over the intake conduit first sidewall 223, thereby enabling the intake conduit sleeve first portion 242 to be press-fit or interference-fit over the intake conduit first sidewall 223. No welds, rivets, or bolts may be needed, thereby eliminating potential spots of failure due to thermal expansion.

An intake conduit sleeve second portion 244 is positioned on a flat portion of the intake conduit first sidewall 223. Furthermore, an intake conduit sleeve third portion 246 axially extends from the intake conduit sleeve first portion 242 towards the intake conduit flange 4. The intake conduit sleeve third portion 246 also includes an intake conduit sleeve third portion end 248 curving towards the intake conduit flange 4. The intake conduit sleeve third portion end 248 may be in contact with the intake conduit flange 4.

The thicker material of the intake conduit sleeve 240 may provide structural reinforcement to the intake conduit first end 224, as well as the intake conduit flange 4. This may prevent failure or cracking due of the intake conduit first end 224 due to thermal expansion, because of the larger intake conduit sleeve thickness, thereby eliminating need for holes and welds. Furthermore, any thermal expansion/contraction loads may be distributed over the long weld coupling the intake conduit flange 4 to the intake conduit first end 224.

A catalyst first end of each of the plurality of catalysts 250 is fluidly coupled to the intake conduit internal volume through the intake conduit second sidewall 225. A plurality of openings may be defined in the intake conduit second sidewall 225. The catalyst first end of each of the plurality of catalysts 250 is fluidly coupled to the plurality of openings defined in the intake conduit second sidewall 225. The catalyst 250 is positioned such that a catalyst axial flow path of each of the plurality of catalysts 250 is normal to the first angle α of inclination of the intake conduit second sidewall 225.

The intake conduit 222 may be formed from a thin and flexible material (e.g., a thin sheet of metal) for ease of manufacturing the curved portion of the intake conduit first sidewall 223. To provide structural support to the intake conduit 222, edges of the intake conduit first sidewall 223 and/or the intake conduit second sidewall 225 may be interposed between structural bars or beams. For example, FIG. 13 is a front view of a portion of the SCR system 220 by the arrow C in FIG. 9.

Figure 13:
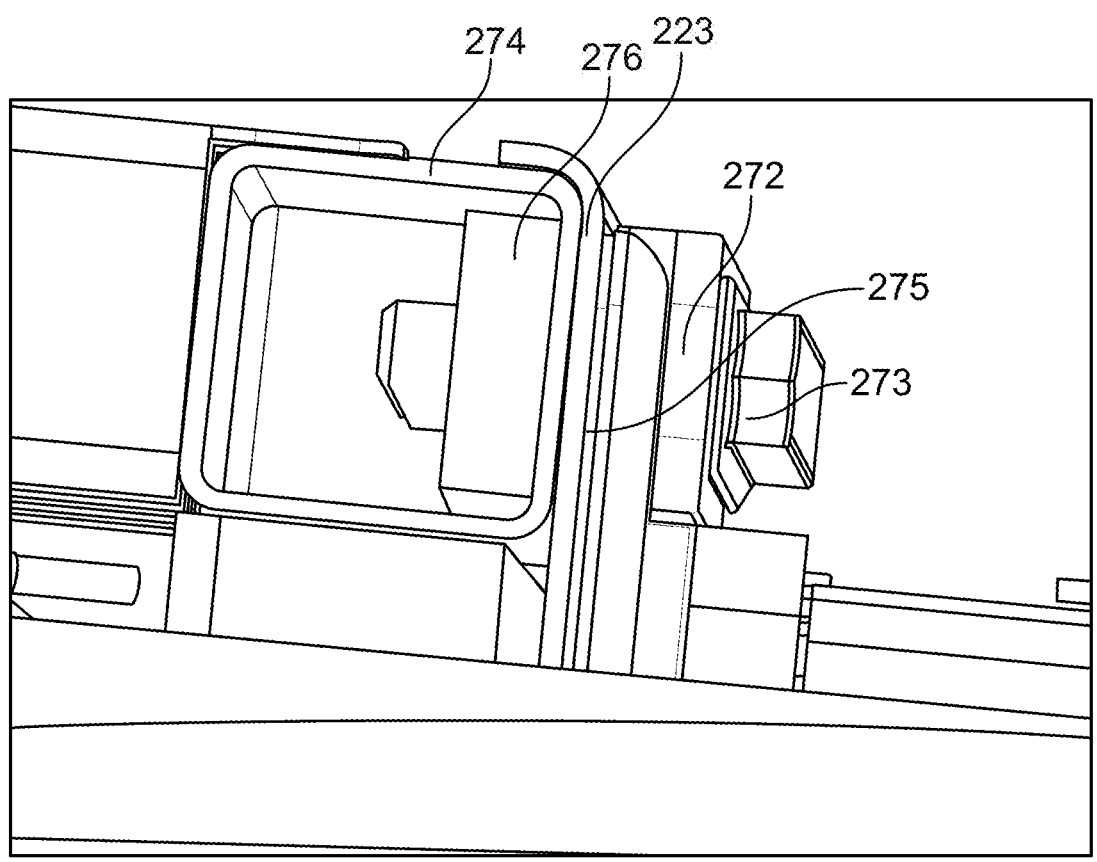
FIG. 13 is a front view of a portion of the SCR system of FIG. 8, as indicated by the arrow C in FIG. 9.

As shown in FIG. 13, a edge of the intake conduit first sidewall 223 is interposed between a first support bar 272 and a second support bar 274. The first support bar 272 and the second support bar 274 may be formed from a thicker material relatively to the intake conduit first sidewall 223 (e.g., a thicker gage iron or steel), and may include hollow struts. The intake conduit first sidewall 223 and/or the intake conduit second sidewall 225 is secured between the first support bar 272 and second support bar 274 by a plurality of bolts 273.

Each of the plurality of bolts 273 engage a backer bar 276 (e.g., a metal block) positioned within the second support bar 274, which may provide additional structural support. An intake conduit gasket 275 is interposed between the first support bar 272 and the portion of the intake conduit first sidewall 223. Interposing the portion of the intake conduit first sidewall 223 between the first support bar 272 and the second support bar 274 creates a stiff joint that allows the intake conduit first sidewall 223 to conform to the first support bar 272 and the second support bar 274. This may result in more uniform pressure applied on the intake conduit gasket 275, thereby sealing the intake conduit 222 from atmosphere.

A catalyst second end of each of the plurality of catalysts 250 opposite the catalyst first end is fluidly coupled to an outlet conduit internal volume and structured to deliver the exhaust gas thereto. As shown in FIGS. 8-10, the outlet conduit 232 comprises an outlet conduit first sidewall 233. At least a portion of the outlet conduit first sidewall 233 defines a second curvature, which may be the same as, or different from the first curvature of the intake conduit first sidewall 223. In particular embodiments, a plurality of second ridges 237 may also be defined on at least a portion of the outlet conduit second sidewall 235, for example to serve as structural ribs, increasing a structural integrity of the outlet conduit first sidewall 233.

The outlet conduit 232 further comprises an outlet conduit second sidewall 235 coupled to the outlet conduit first sidewall 233 so as to define the outlet conduit 232. The catalyst second end of each of the plurality of catalysts 250 is coupled to the outlet conduit internal volume through the outlet conduit second sidewall 235.

The outlet conduit second sidewall 235 is inclined at a second angle β with respect to the longitudinal axis X-X of the SCR system 220, such that an outlet conduit first end 234 of the outlet conduit 232 proximal to the intake conduit second end 226 defines an outlet conduit first end cross-section. Furthermore, an outlet conduit second end opposite the outlet conduit first end 234 defines an outlet conduit second end cross-section smaller than the outlet conduit first end cross-section.

The second angle β may include any suitable inclination angle, for example 5, 10, 15, 20, 25, 30 degrees or any other suitable value or range therebetween. In particular embodiments, the second angle β may be equal to the first angle α of the intake conduit second sidewall 225. In this manner, the outlet conduit 232 is also tapered, thereby defining a variable cross-section which decreases from the outlet conduit first end 234 to the outlet conduit second end. Moreover, each of the plurality of catalysts 250 are positioned such that the catalyst axial flow path is also normal to the second angle β of inclination of the outlet conduit second sidewall 235.

An outlet conduit third sidewall 236 is positioned at the outlet conduit first end 234 so as to seal the outlet conduit first end 234. The outlet conduit 232 defines one or more outlet conduit openings proximal to the outlet conduit second end to allow the exhaust gas to exit the outlet conduit 232. A first exhaust tube 238a, and a second exhaust tube 238b are fluidly coupled to the outlet conduit openings. In some embodiments, each of the outlet conduits 232 included in the first leg 201a and the second leg 201b of the aftertreatment system 200 may combine together in a plenum portion fluidly coupled to the first exhaust tube 238a and/or the second exhaust tube 238b.

Figure 26:
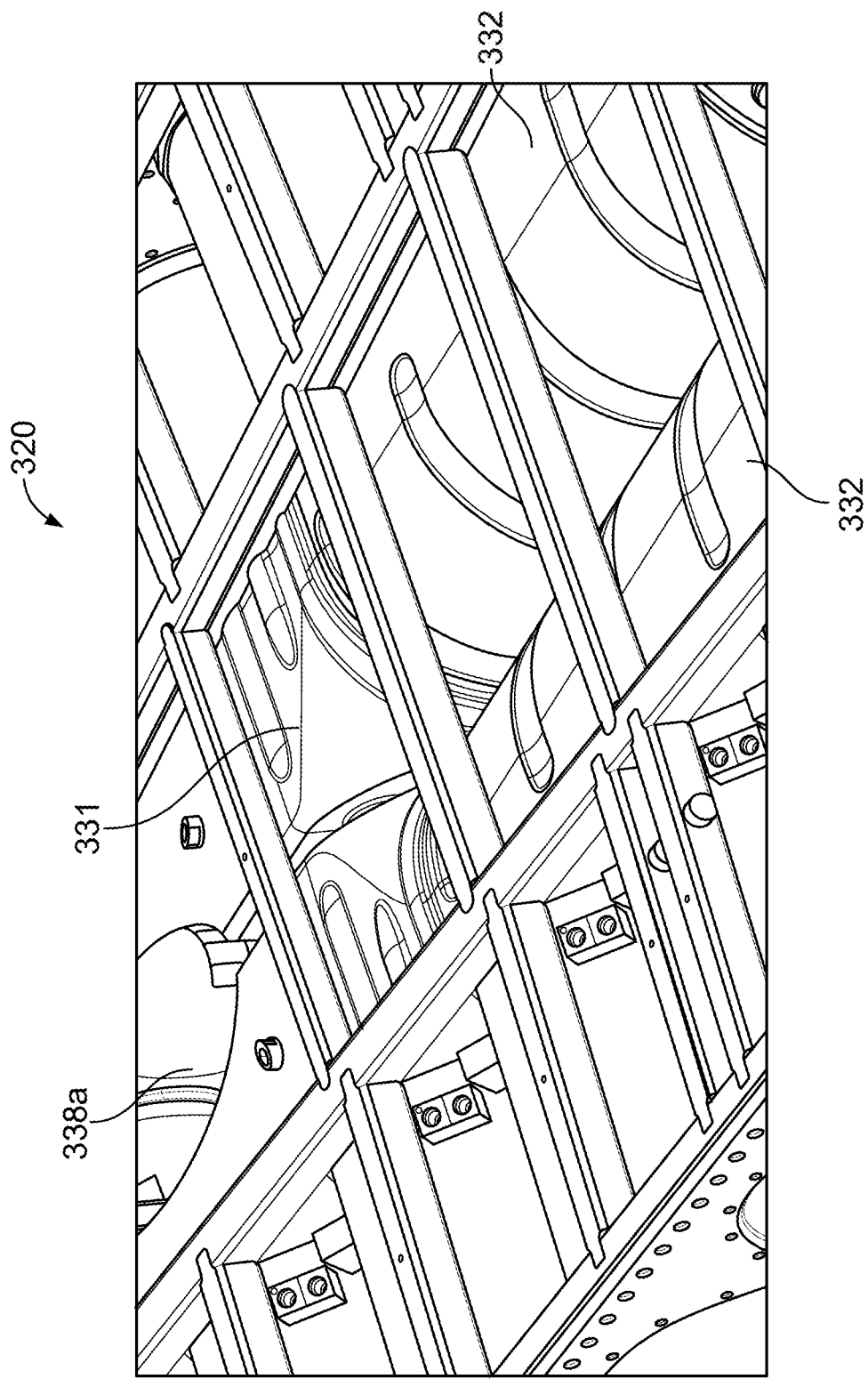
FIG. 26 is a top perspective view of a portion of an SCR system, according to another embodiment.

For example, FIG. 26 is top perspective view of a SCR system 320 according to another embodiment. The SCR system 320 comprises an outlet conduit 332 and may comprise other components as described with respect to the SCR system 220. An outlet conduit transition tube 331 is fluidly coupled to outlet conduit 332 at the outlet conduit second end.

At least a portion of the outlet conduit transition tube 331 defines a transition tube cross-section which is larger than the outlet conduit second end cross-section. The outlet conduit transition tube 331 may also be formed from a thicker material than the outlet conduit 332. The outlet conduit transition tube 331 may accommodate thermal expansion of the outlet conduit 332, seal the outlet conduit second end, and provide structural support to the outlet conduit 332.

Figure 14:
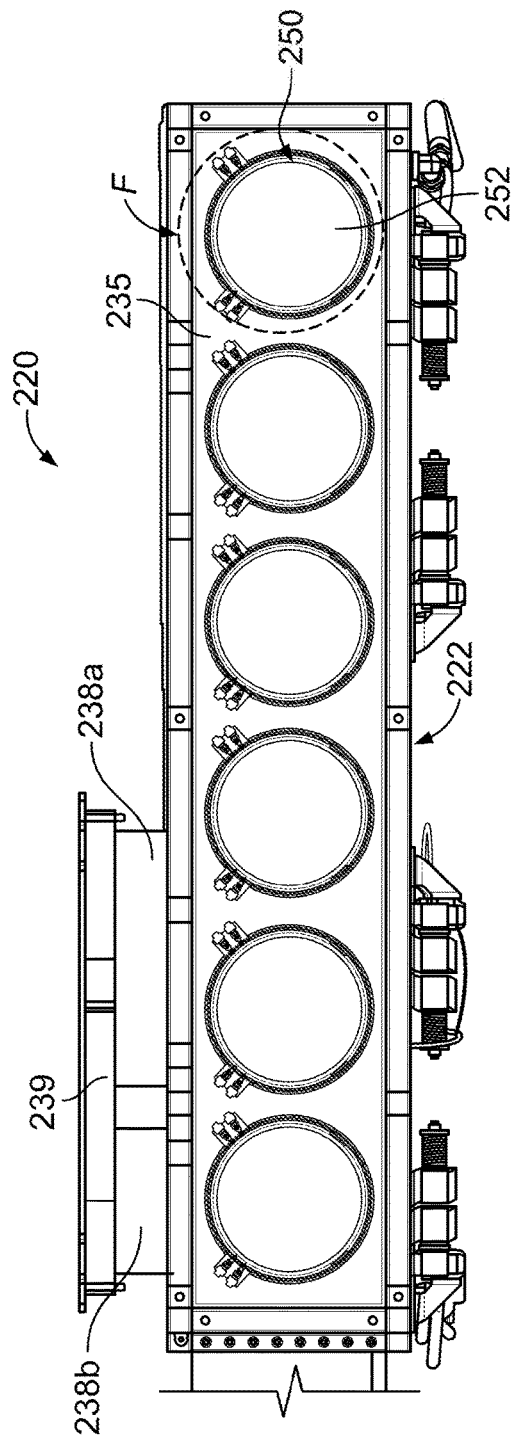
FIG. 14 is a side view of the SCR system of FIG. 8 with the intake conduit removed for clarity to show a plurality of catalysts included in the SCR system.
Figure 15:
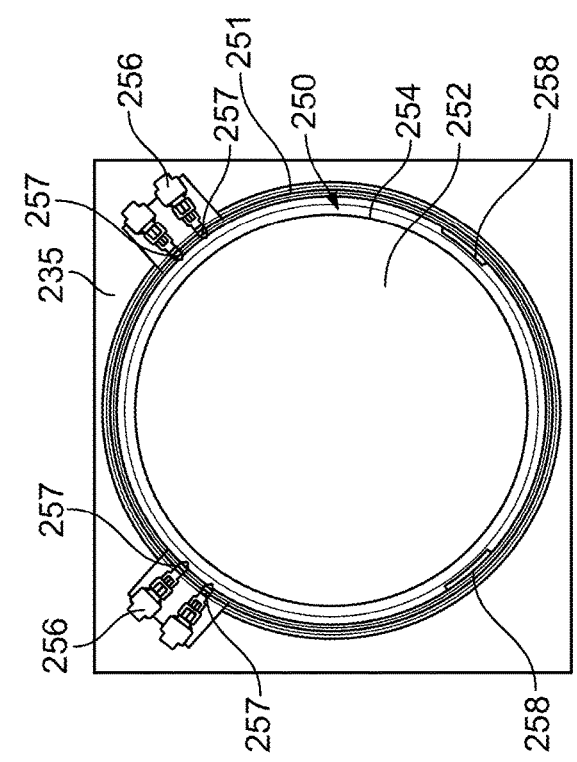
FIG. 15 is a side view of a catalyst included in a portion of the SCR system of FIG. 8, as indicated by the arrow F in FIG. 14.
Figure 16:
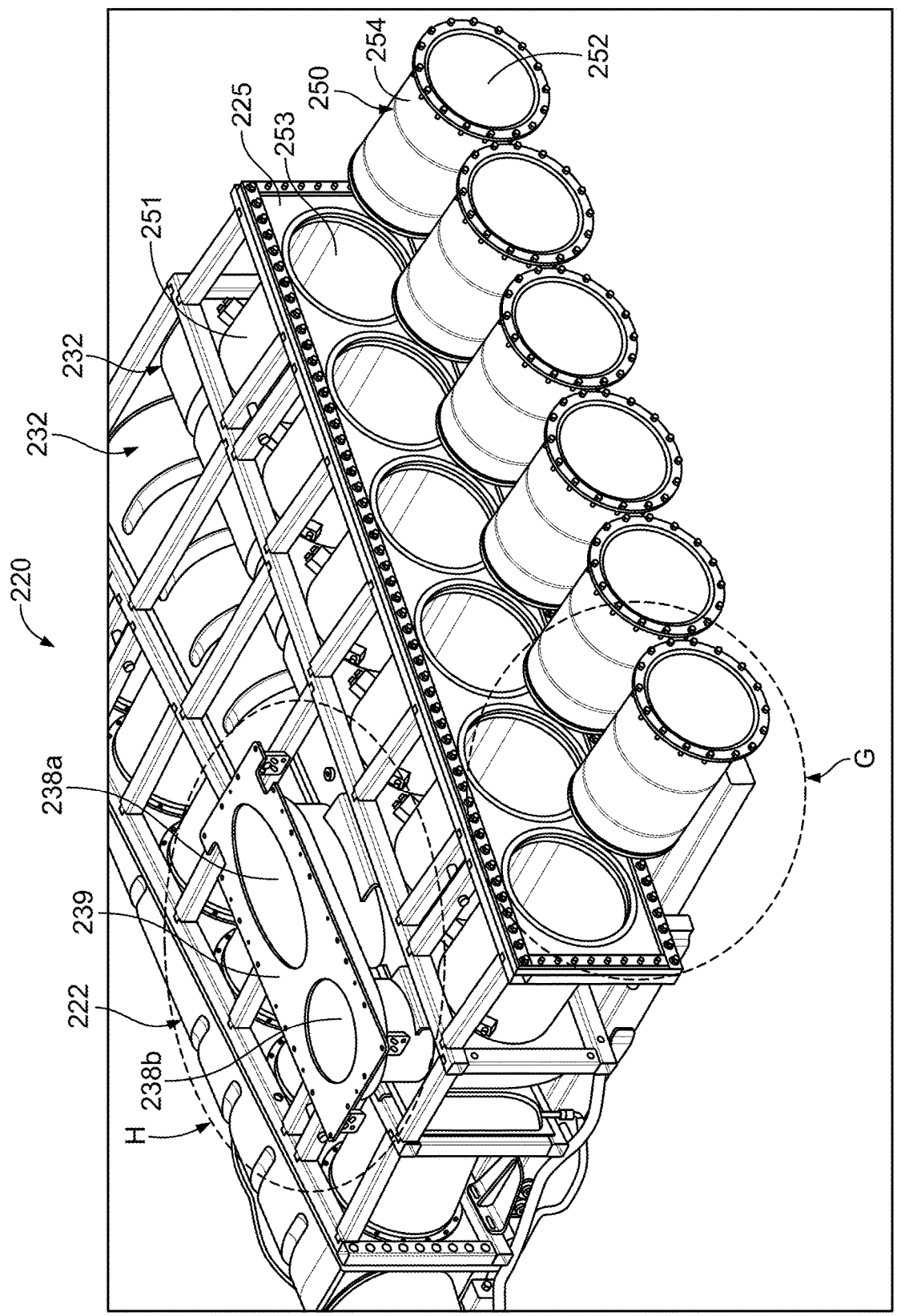
FIG. 16 is a top perspective view of the SCR system of FIG. 8 with an intake conduit removed for clarity, and showing the plurality of catalysts included in the SCR system removed from corresponding catalyst sleeves included in the SCR system.

Referring again to the aftertreatment system 200, the SCR system 220 also comprises a plurality of catalyst sleeves 251 coupling the intake conduit 222 to the outlet conduit 232. Each of the plurality of catalysts 250 is positioned within a corresponding catalyst sleeve 251. FIG. 14 is a side view of the SCR system 220 with the intake conduit removed for clarity, to show the plurality of catalysts 250 included therein. FIG. 15 is a side view of one catalyst 250 included in a portion of the SCR system 220, as indicated by the arrow F in FIG. 14. FIG. 16 shows a plurality of catalysts 250 included in one leg of the SCR system 220 removed from their corresponding catalyst sleeves 251. Each of the catalyst 250 includes a catalyst material 252 positioned within a catalyst can 254.

Figure 17:
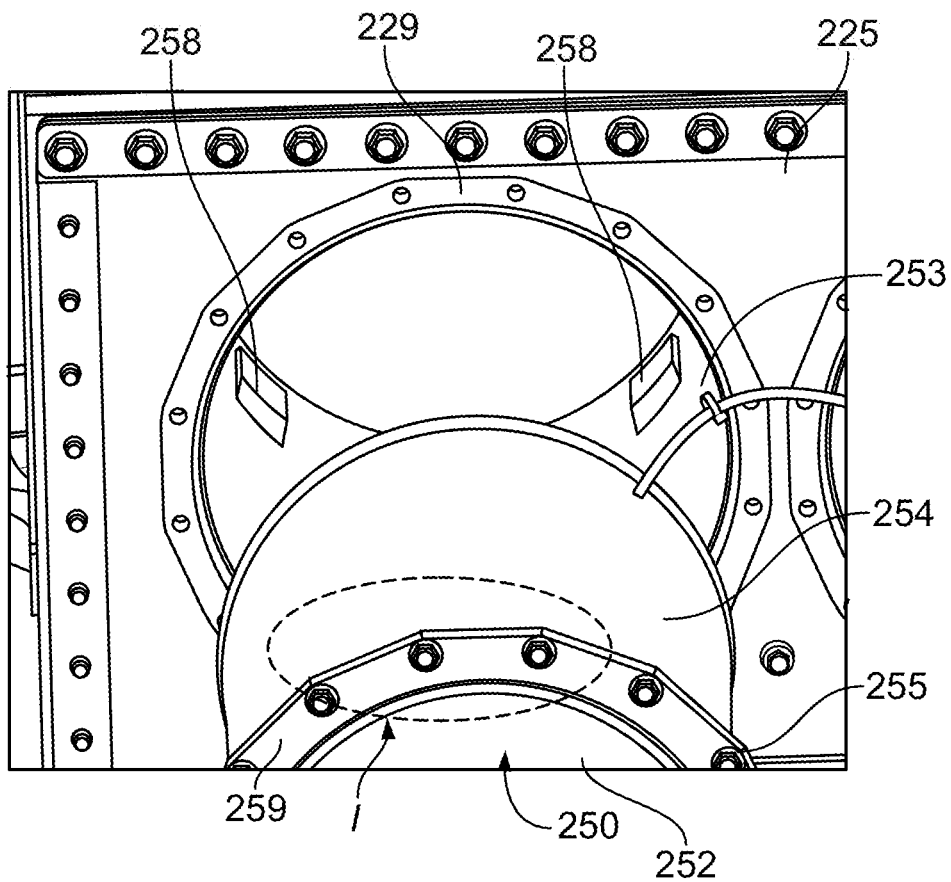
FIG. 17 is a top perspective view of a portion of the SCR system of FIG. 16, as indicated by the arrow G in FIG. 16.

FIG. 17 is a top perspective view of a portion of the SCR system 220 indicated by the arrow G in FIG. 16. As shown in FIGS. 15 and 17, a plurality of sleeve ramps 258 are positioned on a catalyst sleeve inner sidewall 253 of each of the plurality of catalyst sleeves 251. The plurality of sleeve ramps 258 are structured to engage the catalyst can 254 of the catalyst 250, so as to facilitate centering of an catalyst axial flow path of the corresponding catalyst 250 to an exhaust gas axial flow path within the corresponding catalyst sleeve 251. In particular embodiments, the plurality of sleeve ramps 258 may be positioned on a bottom portion of the catalyst sleeve inner sidewall 253 relative to gravity.

Figure 18:
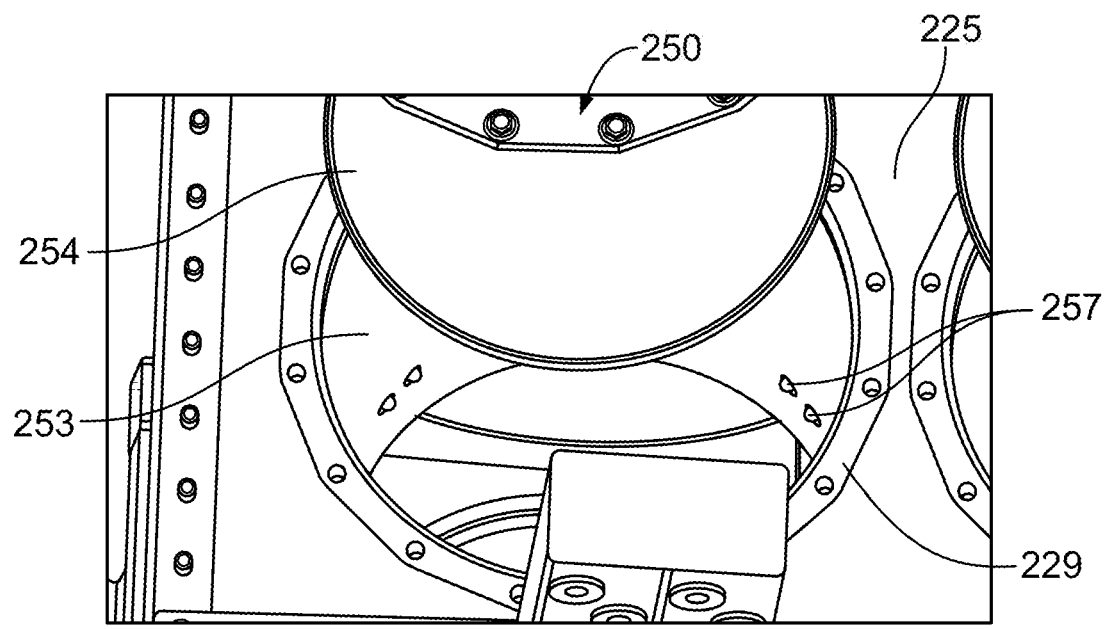
FIG. 18 is bottom perspective of a portion of the portion of the SCR system of FIG. 16, as indicated by the arrow G in FIG. 16.

FIG. 18 is bottom perspective of a portion of the portion of the SCR system 220 indicated by the arrow G in FIG. 16. A securing mechanism is positioned on each catalyst sleeve 251. As shown in FIGS. 15 and 18, the securing mechanism comprises a plurality of jacking bolts 256, each of the plurality of jacking bolts 256 having a ball end 257. The ball end 257 of each of the jacking bolt 256 protrudes through the catalyst sleeve inner sidewall 253, and may be positioned on a top portion of the catalyst sleeve inner sidewall 253 relative to gravity.

The plurality of jacking bolts 256 are structured to be engaged so as to urge the ball end 257 thereof towards the corresponding catalyst 250. The ball ends 257 press on the catalyst can 254 thereof, thereby securing the at least one catalyst 250 within the corresponding catalyst sleeve 251. The plurality of sleeve ramps 258 and the plurality of jacking bolts 256 may allow for centering of the catalyst 250 within the corresponding catalyst sleeve 251, and securing of the catalyst 250 therein while still allowing for axial thermal expansion and contraction of the catalyst 250. Furthermore, use of ball ends 257 with the jacking bolts 256 may provide a smoother contact on the catalyst can 254 of each catalyst 250, which may prevent gouging of the catalyst cans 254 due to the tightening of the jacking bolts 256.

Figure 19:
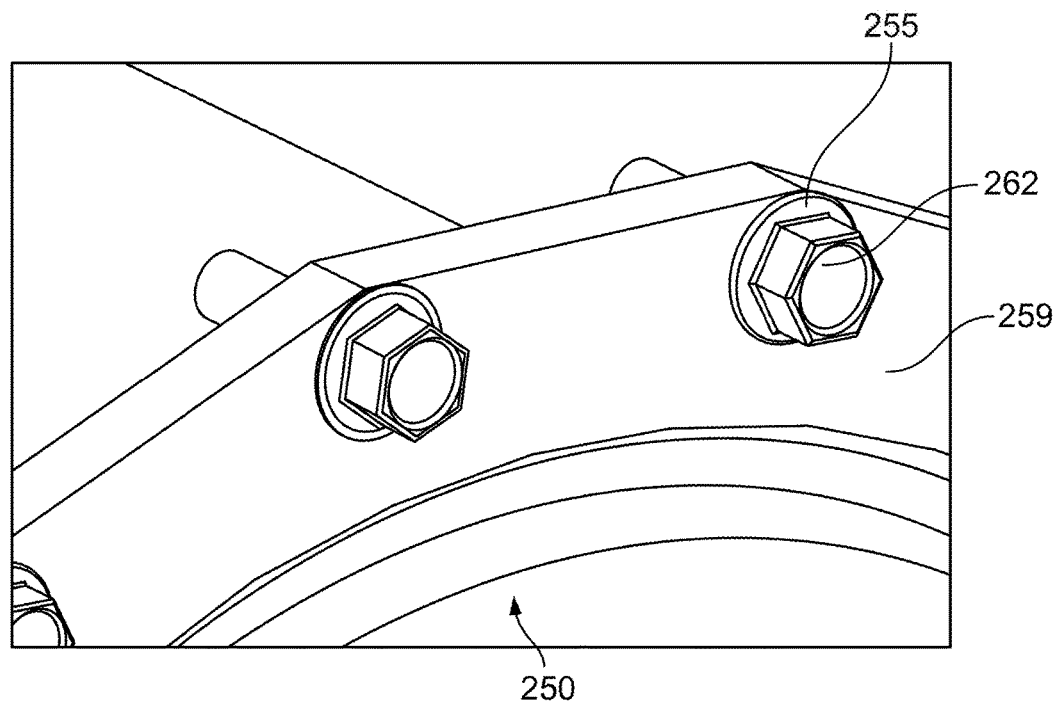
FIG. 19 is a front perspective view of a portion of the SCR system of FIG. 16, as indicated by the arrow I in FIG. 17.

FIG. 19 is a front perspective view of a portion of the SCR system 220 indicated by the arrow I in FIG. 17. As shown in FIGS. 17 and 19, the catalyst can 254 of the catalyst 250 comprises a catalyst can flange 259. The catalyst can flange 259 is structured to be coupled to the outlet conduit second sidewall 235 via a plurality of can flange bolts 262. A can flange bolt gasket 255 is interposed between a head of each of the plurality of can flange bolts 262 and catalyst can flange 259.

Moreover, a can flange gasket 229 is interposed between the catalyst can flange 259. The combination of the can flange gasket 229, and the can flange bolt gaskets 255 is structured to prevent leakage of the catalyst material 252 and/or the exhaust gas from the interface where the catalyst can flange 259 is coupled to the outlet conduit second sidewall 235. The catalyst can 252 may also be coupled to the intake conduit second sidewall 225 in a similar manner.

Figure 20:
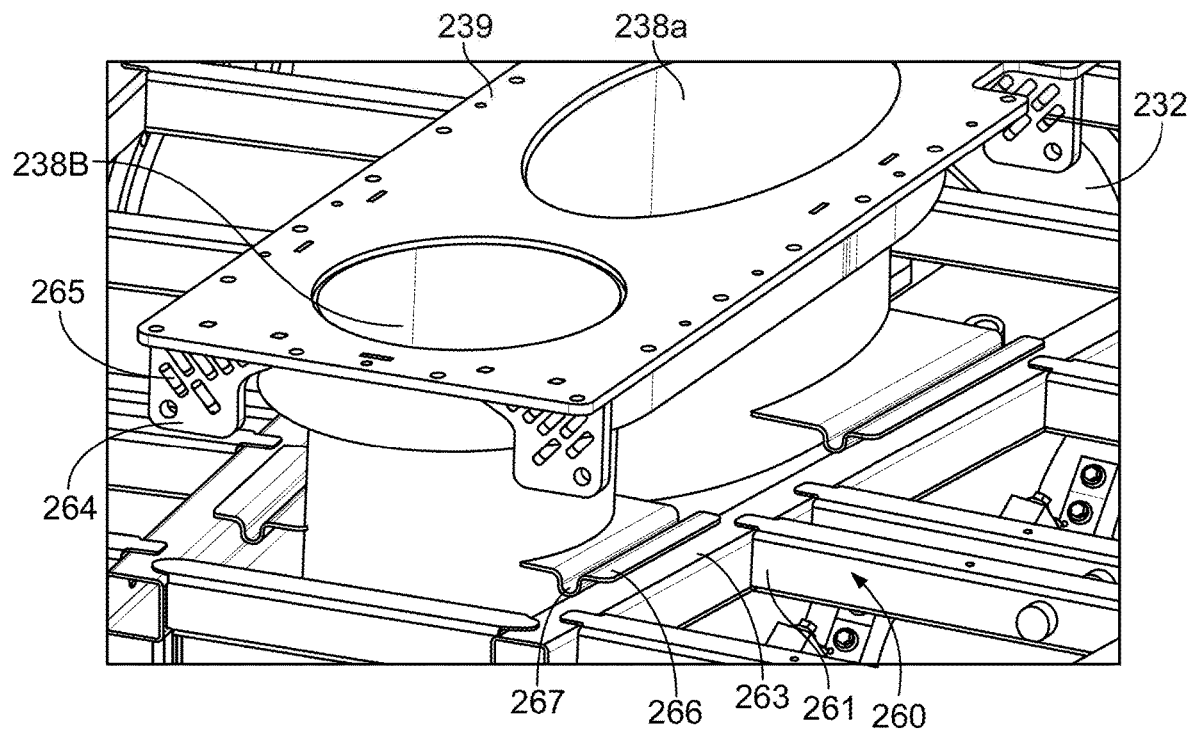
FIG. 20 is a top perspective view of a portion of the SCR system of FIG. 8, which includes a first exhaust tube and a second exhaust tube.

FIG. 20 is a top perspective view of a portion of the SCR system 220 proximal to the outlet conduit second end. The first exhaust tube 238a, and the second exhaust tube 238b are fluidly coupled to the outlet conduit second end (e.g., a plenum portion defined in the outlet conduit second end). An exhaust tube plate 239 is coupled to each of the first exhaust tube 238a, and the second exhaust tube 238b at an end thereof distal from the outlet conduit 232. The exhaust tube plate 239 may serve to provide structural support to the first exhaust tube 238a and the second exhaust tube 238b, as well as provide a coupling interface for coupling the first exhaust tube 238a and the second exhaust tube 238b to an exhaust tail pipe included in a vehicle or equipment in which the aftertreatment system 200 is installed.

A plurality of lugs 264 are positioned on the exhaust tube plate 239. As shown in FIG. 20, the plurality of lugs 264 are positioned at corners of the exhaust tube plate 239 and extend axially therefrom towards the outlet conduit 232. In other embodiments, the plurality of lugs 264 may be positioned at any suitable location on the exhaust tube plate 239. Each of the plurality of lugs 264 comprise a plurality of slots 265 defined therethrough.

The plurality of lugs 264 may serve as coupling locations for a temperature sensitive grounding rope (not shown) with a minimum cross-section material requirement to be connected to the outlet conduit 232 of the SCR system 220. The combination of the positioning of the plurality of slots 265 defined in the plurality of lugs 264, a thickness of the lugs 264, and a shape thereof may decrease a temperature at the interface of the exhaust tube plate 239 with the exhaust tail pipe so as to maintain the temperature of the interface below a predetermined temperature.

Furthermore, a support frame 260 is positioned about the SCR system 220. The support frame 260 comprises a plurality of first support struts 261 and a plurality of second support struts 263, coupled together to form the support frame 260. At least a portion of the first support struts 261 are oriented normal to the second support struts 263, and coupled thereto at an end thereof so as to define a cross-beam structure forming the support frame 260.

A plurality of support plates 266 are positioned between each of the first exhaust tube 238a and the second exhaust tube 238b, and a corresponding second support strut 263. A first end of each of the support plates 266 may be coupled to the first exhaust tube 238a and/or the second exhaust tube 238b, and a second end thereof is coupled to the corresponding second support strut 263.

At least one bellow 267 is defined in each of the plurality of support plates 266. The at least one bellow 267 is structured to lower a stiffness of the support plates 266. For example, the support frame 260 may have a lower temperature then a temperature of the first exhaust tube 238a and the second exhaust tube 238b. The difference in temperature results in different rates of thermal expansion and contraction of the first exhaust tube 238a and the second exhaust tube 238b relative to the support frame 260. The support plates 266 may not only provide structural support to the first exhaust tube 238a and the second exhaust tube 238b, but the bellows 267 defined therein may also serve to dampen vibration effects, as well as thermal loading on the first exhaust tube 238a and the second exhaust tube 238b.

Figure 21:
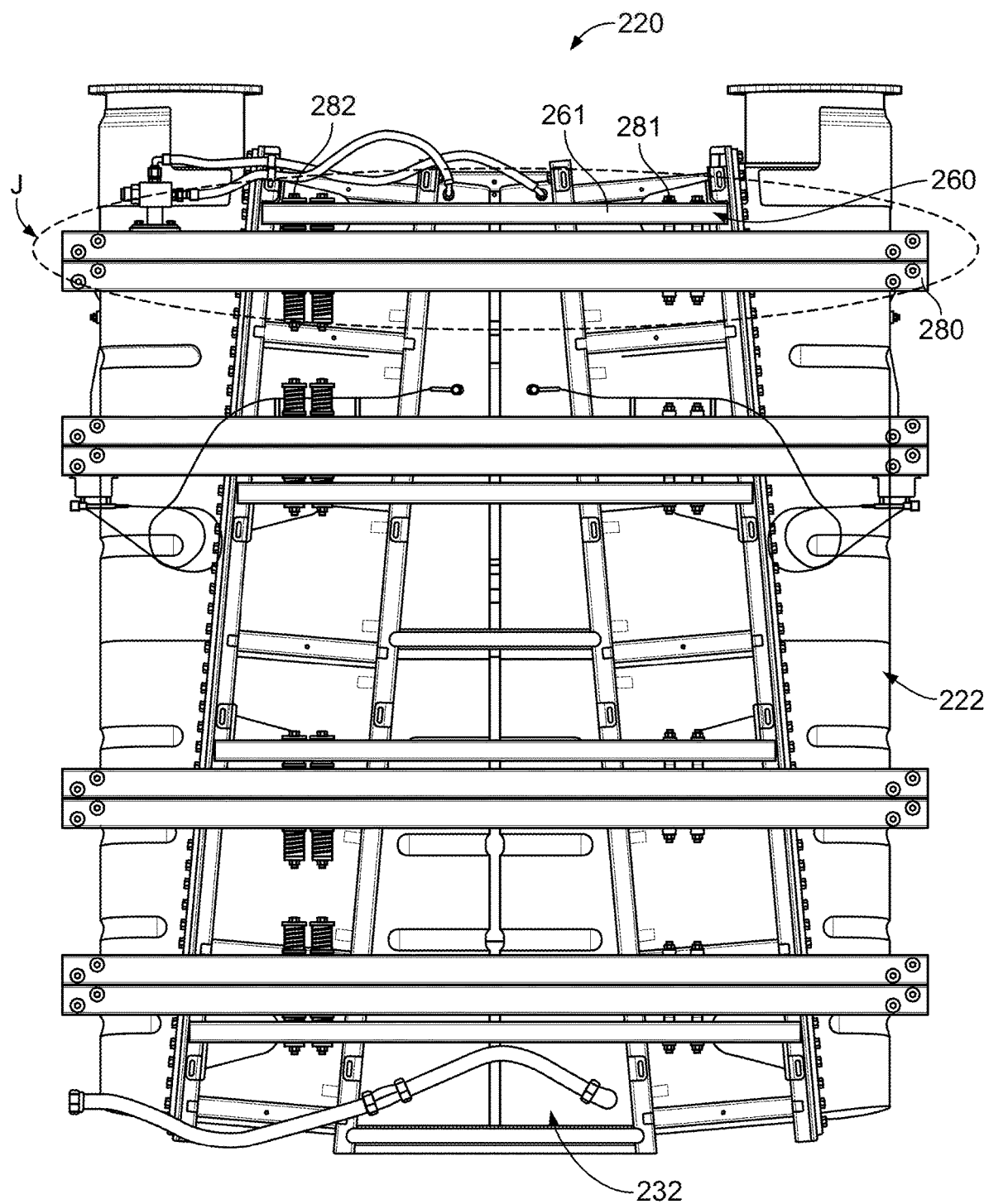
FIG. 21 is a bottom view of the SCR system of FIG. 8.
Figure 22:
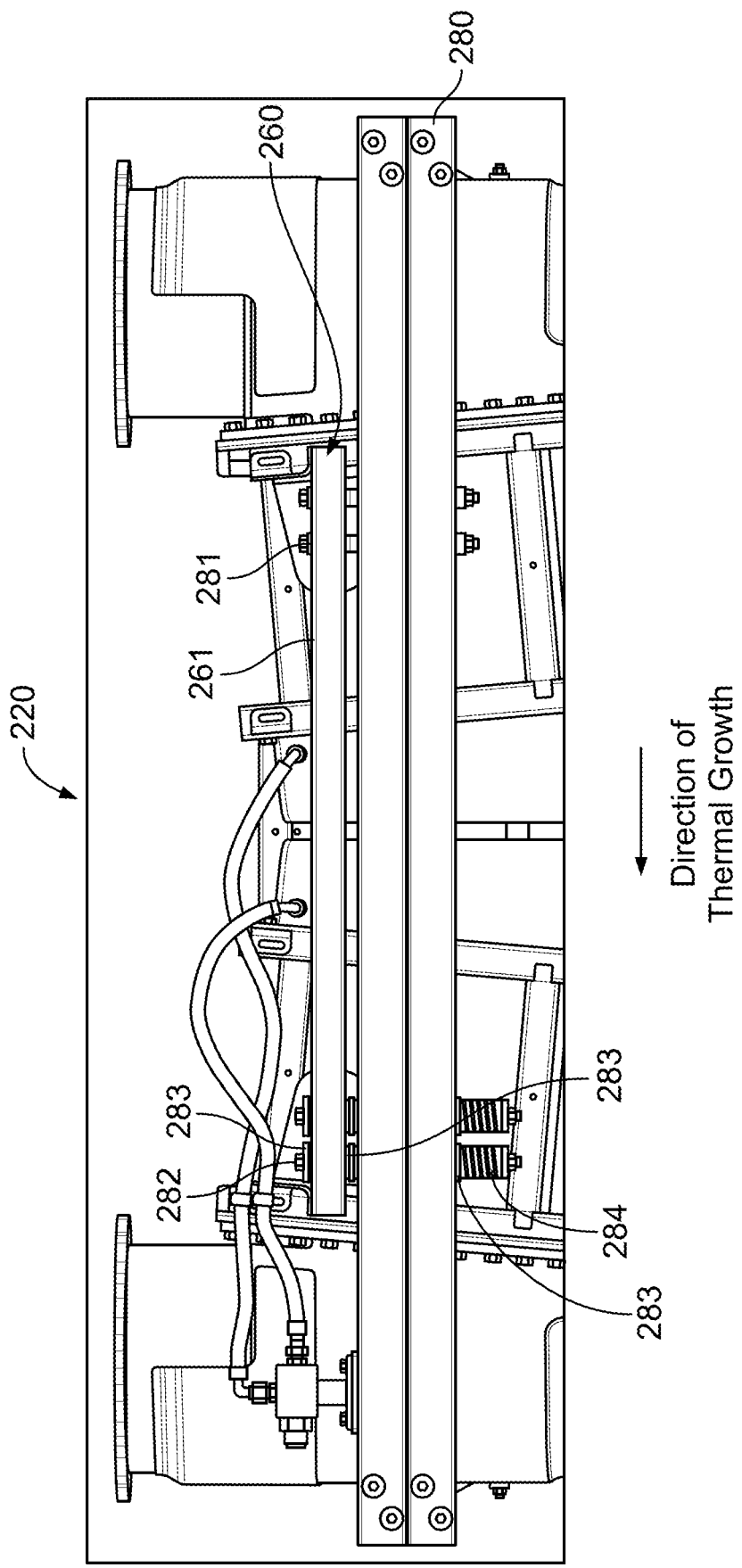
FIG. 22 is a bottom view of a portion of the SCR system of FIG. 21, as indicated by the arrow J in FIG. 21.

FIG. 21 is a bottom view of the SCR system 220. The SCR system 220 is coupled to a plurality of mounting struts 280 via the support frame 260. The mounting struts 280 may comprise rigid bars, for example, aluminum, steel, cast iron bars, etc. on which the SCR system 220 is mounted via the support frame 260. FIG. 22 is a bottom view of a portion of the SCR system 220 indicated by the arrow J in FIG. 21. The mounting struts 280 are positioned normal to the longitudinal axis X-X of the SCR system 220. In other embodiments, the mounting struts 280 may be oriented in any suitable orientation (e.g., parallel to the longitudinal axis X-X, a diagonal orientation, a crisscross orientation, etc.).

As shown in FIGS. 21 and 22, the first support struts 261 of the support frame 260 are coupled to the mounting struts 280 at a first location proximal to the first leg of the SCR system 220, and at a second location proximal to the second leg of the SCR system 220. At the first location, the first support struts 261 are coupled to the corresponding mounting strut 280 by a fixed coupling mechanism 281, for example a bolt, nut screw, rivet or any other fixed suitable coupling mechanism so as to provide a fixed and immovable joint.

At the second location, the first support strut 261 is coupled to the corresponding mounting strut 280 such that a sliding interface exists therebetween, so as to allow for thermal expansion or contraction. For example, slots are provided at the second location of the first support strut 261 and/or the corresponding mounting strut 280. A pin 282 (e.g., a screw, rivet, bolt, etc.) is inserted through the slot.

First washers 283 are positioned on either side of first support strut 261 and the mounting strut 280. The first washers 283 may comprise coated washers (e.g., washers coated with a low friction material such as graphite, ceramic, graphene, etc.) or may be formed from a low friction material (e.g., ceramics). The low friction of the first washers 283 allow for axial movement or slipping of the first support strut 261 and/or the mounting strut 280 therebetween so as to accommodate any thermal expansion or contraction in a direction of thermal growth as shown in FIG. 22.

To maintain a compressive force on the first washers 283, a compliance member 284 (e.g., a helical spring, a Belleville spring, a leaf spring or any other suitable compliance member) is also coupled to at least a portion of the first washers 283. The compliance member 284 maintains a preload on the first washers 283, thereby providing a constant force so as to resist vibrational separation. In this manner, the pin 282 can slide in the slot on the first support strut 261 and/or the mounting strut 280 as the system grows in the direction of thermal growth, and/or thermally contracts in the opposite direction. The first washers 283 allows the pin 282 to slide in the slot while maintaining coupling to the first support strut 261 and the mounting strut 280. Moreover, the compliance member 284 maintains the compressive force on the first washers 283.

Figure 23:
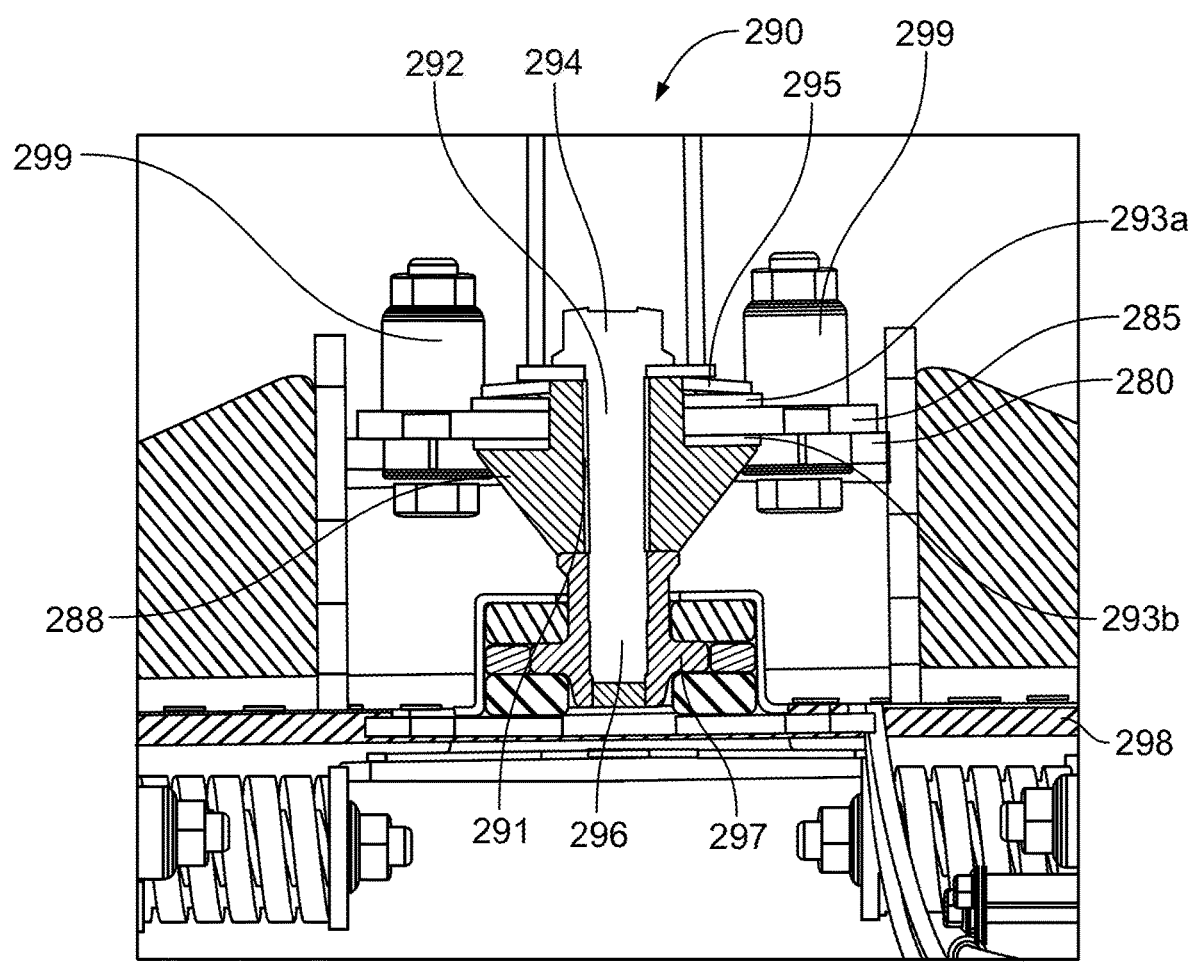
FIG. 23 is a side cross-section view of a portion of the aftertreatment system of FIG. 2, indicated by the arrow Y and taken along the line Z-Z as shown in FIG. 2.

As shown in FIG. 2, a plurality of mounting struts 280 may be used to mount the aftertreatment system 200 to a mounting interface 298 as shown in FIG. 23 (e.g., an isolation frame) at a desired location, for example on a vehicle or equipment that employs the aftertreatment system 200. The ends of the plurality of mounting struts 280 comprise mounting plates 285 which may be used to mount the aftertreatment system 200 at a desired location on the mounting interface 298.

A first set of the mounting plates 285 may be coupled to the mounting interface 298 via a fixed mounting coupling mechanism 286 (e.g., bolts, screws, nuts, rivets, etc.). The fixed mounting coupling mechanism 286 does not allow any movement of the mounting struts 280 relative to the mounting interface 298, and serves as origin points for the direction of thermal growth of the aftertreatment system 200, as shown in FIG. 2.

Furthermore, a second set of the mounting plates 285 are coupled to the mounting interface 298 via a movable mounting coupling mechanism 290, as shown in FIG. 2. FIG. 23 is a side cross-section view of a movable mounting coupling mechanism 290 included in the aftertreatment system 200, indicated by the arrow Y in FIG. 2, and taken along the line Z-Z as shown in FIG. 2.

As shown in FIG. 23, the mounting plate 285 is separate from the mounting strut 280 and is coupled thereto by a plurality of bolts 299. In other embodiments, the mounting plate 285 may be monolithically formed with the mounting strut 280. A mounting slot 291 is defined in the mounting plate 285. The movable mounting coupling mechanism 290 comprises a mounting bolt 292 coupled to a portion of the mounting interface 298. A mounting bolt first portion 294 of the mounting bolt 292 includes a mounting bolt head and is positioned proximal to the mounting plate 285.

A mounting bolt second portion 296 of the mounting bolt 292 is inserted through the mounting slot 291, and is coupled to a mounting bolt receptacle 297 provided in the portion of the mounting interface 298. For example, the mounting bolt receptacle 297 may comprise a nut or define a cylindrical channel comprising a plurality of threads defined on an inner surface thereof. The plurality of threads may be structured to receive mating threads defined on the mounting bolt second portion 296, so as to couple to the mounting bolt second portion 296 to the mounting interface 298.

A first mounting washer 293a is positioned on a first surface of the mounting plate 285 proximal to the mounting bolt first portion 294. A second mounting washer 293b is positioned on a second surface of the mounting plate 285 opposite to the first surface of the mounting plate 285, such that the mounting plate 285 is interposed between the first mounting washer 293a, and the second mounting washer 293b about the mounting slot 291. The first mounting washer 293a and the second mounting washer 293b may comprise coated washers (e.g., washers coated with a low friction material such as graphite, ceramic, grapheme, etc.) or may be formed from a low friction material (e.g., ceramics).

A mounting compliance member 288 is positioned between the second mounting washer 293b and the mounting bolt receptacle 297. The mounting compliance member 288 may comprise, for example a jacket, a grommet or any other suitable compliance member. The mounting compliance member 288 may be formed from any suitable material (e.g., a metal, rubber, polymer, plastics, wood, etc.).

The mounting compliance member 288 is structured to engage at least a portion of the second mounting washer 293b and at least a portion of the mounting bolt receptacle 297, such that it exerts a compressive force on the second mounting washer 293b as the mounting bolt 292 engages the mounting bolt receptacle 297. In this manner, the mounting compliance member 288 ensures that the second mounting washer 293b remains in contact with the second surface of the mounting plate 285.

A mounting preload member 295 is interposed between the first mounting washer 293a and the mounting bolt first portion 294. The mounting preload member 295 can include any suitable member structured to exert a compressive force on the first mounting washer 293a, for example, a Belleville spring, a helical spring, a coil spring, a leaf spring, etc. In particular embodiments, the mounting preload member 295 comprises a Belleville spring.

The low friction of the first mounting washer 293a and the second mounting washer 293b allow for axial movement or slipping of the mounting bolt second portion 296 within the mounting slot 291 relative to the mounting plate 285, so as to accommodate any thermal expansion or contraction of the aftertreatment system 200 in a direction as shown in FIG. 2. Furthermore, the mounting preload member 295 maintains the compressive force or preload on the first mounting washer 293a, thereby urging the first mounting washer 293a to remain in contact with first surface of the mounting plate 285.

The mounting preload member 295 also urges the mounting bolt first portion 294 away from the mounting plate 285, thereby urging the mounting bolt receptacle 297, and the mounting compliance member 288 towards the second mounting washer 293b. In this manner, the mounting preload member 295 and the mounting compliance member 288 resist relative motion between the mounting plate 285 and the mounting interface 298 due to random vibration, while still allowing for thermal contraction or growth of the aftertreatment system 200 relative to the mounting interface 298.

Figure 24:
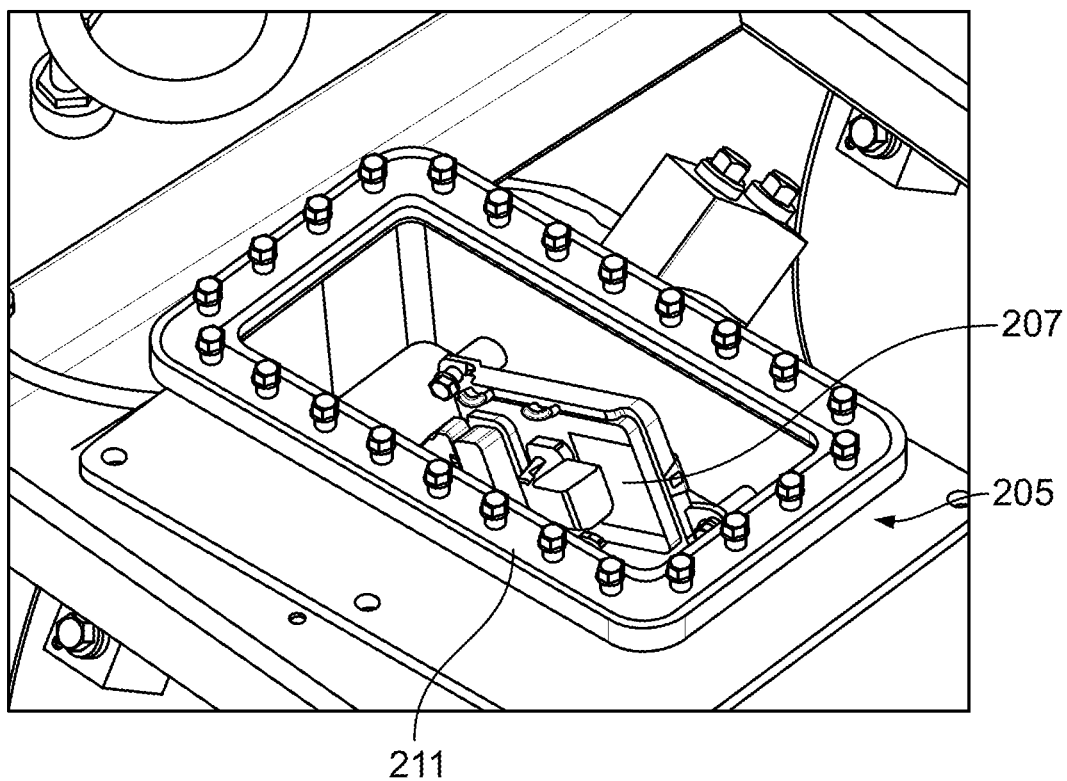
FIG. 24 is a top perspective view of a sensor assembly included in the aftertreatment system of FIG. 2, with a sensor housing cover removed.
Figure 25:
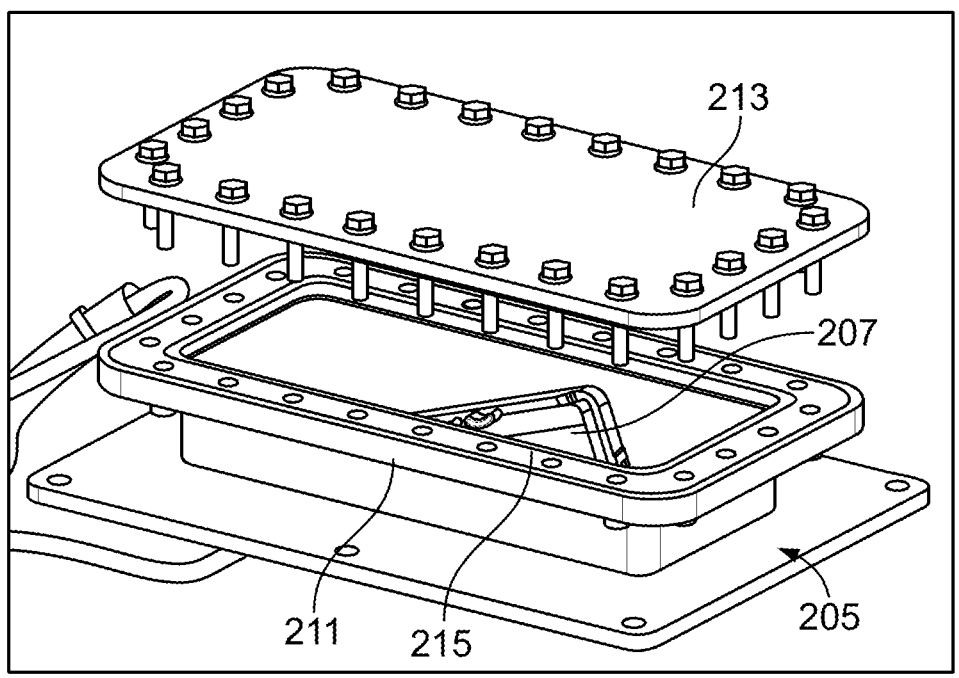
FIG. 25 is another top perspective view of the sensor assembly of FIG. 24 showing the sensor housing cover uncoupled from a sensor housing.

As described before, plurality of sensors such as, for example a NOx sensor, a SOx sensor, an oxygen sensor, a CO sensor, etc. may be provided in the aftertreatment system 200. In various embodiments, as shown in FIG. 2, the aftertreatment system 200 comprises a sensor assembly 205 positioned proximal to the intake conduit 222. As shown in FIGS. 24 and 25, the sensor assembly 205 comprises a sensor housing 211 defining a sensor housing internal volume within which a sensor 207 is positioned. In particular embodiments, the sensor 207 comprises a NOx sensor. The sensor housing 211 may be formed from any suitable material, for example metals (e.g., aluminum, steel, iron, alloys, etc.).

A sensor housing cover 213 is positioned on the sensor housing 211. A sensor housing gasket 215 (e.g., a rubber seal, an O-ring, etc.) is positioned within a gasket track defined within the sensor housing 211 such that at least a portion of the sensor housing gasket 215 is positioned within the gasket track. The sensor housing cover 213 is coupled to the sensor housing 211 via a plurality of screws. In other embodiments, the sensor housing cover 213 may be coupled to the sensor housing 211 using any suitable coupling mechanism, such as for example, bolts, rivets, a snap-fit mechanism, a friction-fit, or any other suitable coupling mechanism.

The sensor housing 211 and the sensor housing cover 213 cooperatively with the sensor housing gasket 215, define a seal tight interface (e.g., a water tight enclosure) so as to hermetically seal the sensor housing internal volume from the environment, thereby protecting the sensor 207 positioned therein (e.g., from humidity). Nesting of at least a portion of the sensor housing gasket 215 within the gasket track allows for contact between the sensor housing 211 and the sensor housing cover 213 when the sensor housing cover 213 is coupled to the sensor housing 211. A depth of the gasket track may be defined so as to allow a predefined compression of the sensor housing gasket 215 between the sensor housing 211 and the sensor housing cover 213 to a repeatable percentage. This allows for sealing to happen with good repeatability, and may also prolong a life of the sensor housing gasket 215.

Figure 27:
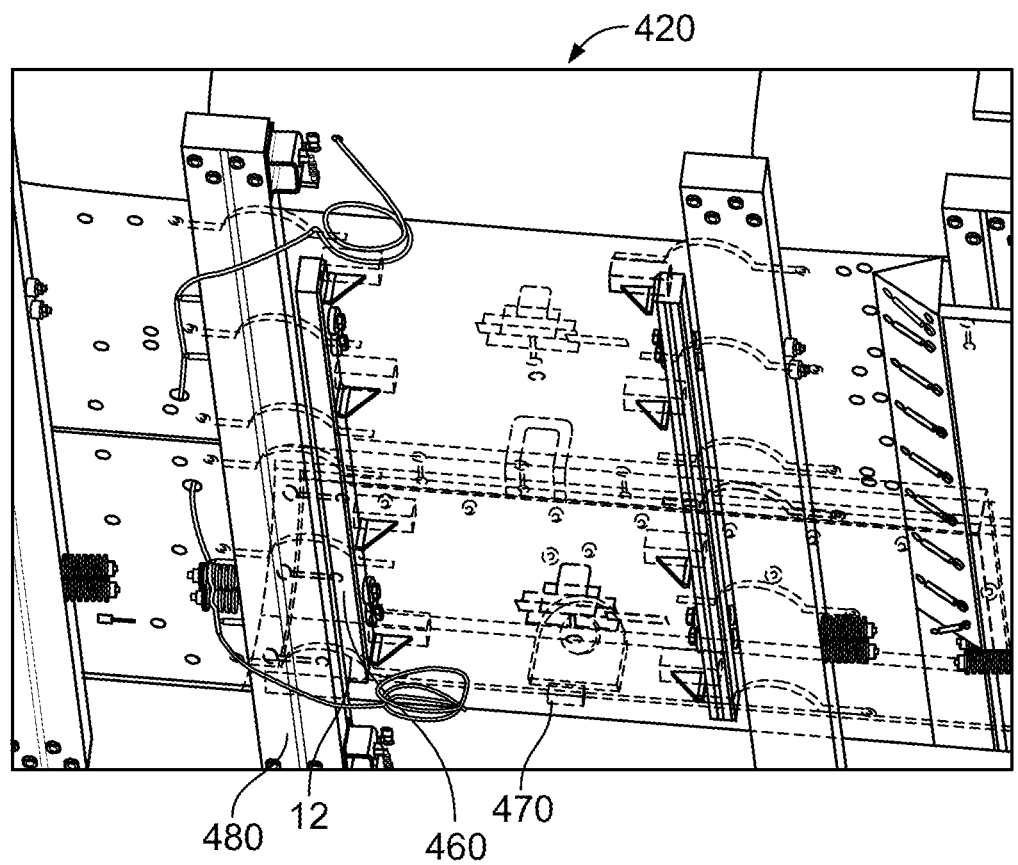
FIG. 27 is a bottom perspective view of an SCR system according to yet another embodiment.

In some embodiments, an SCR system (e.g., the SCR system 220) or any other component included in an aftertreatment system (e.g., the aftertreatment system 200) maybe insulated with an insulation layer, for example a thermal insulation layer. For example, FIG. 27 is a bottom perspective view of an SCR system 420 according to yet another embodiment. The SCR system 420 may be substantially similar to the SCR system 220 and therefore not described in further detail herein. The SCR system 420 also includes a support frame 460 (e.g., the support frame 260), and is mounted on a plurality of mounting struts 480 (e.g., the mounting struts 280 as described previously in detail herein).

An insulation layer 470 is positioned on the SCR system 420. The insulation layer 470 may be formed from any suitable material, such as a thermal insulating material (e.g., fiber glass, mineral wool, polyurethane foam, cellulose, etc.). The insulation layer 470 is secured on the SCR system 220 via a plurality of straps 12. Each of the plurality of straps 12 may comprise rubber straps, fiber straps, threads, metal wires, ropes, etc.

Figure 28:
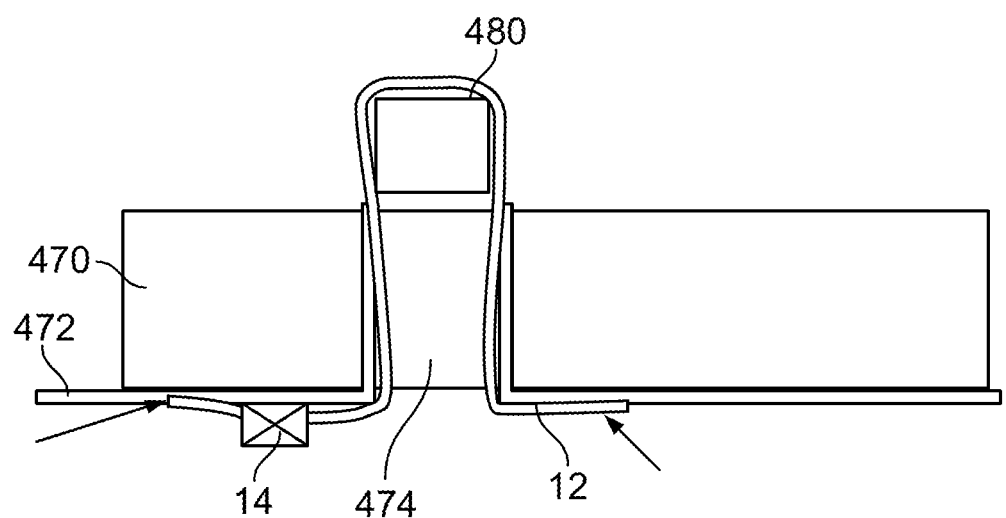
FIG. 28 is a schematic illustration of a portion of the SCR system of FIG. 27, showing a strap for securing an insulation to an exterior surface of the SCR system.

FIG. 28 is a schematic illustration of one strap 12 of the plurality of straps 12 securing the insulation layer 470 to the SCR system 420. Each of the plurality of straps 12 are embedded (e.g., sown) into an insulation layer outer surface 472 of the insulation layer 470. A plurality of insulation layer openings 474 may be defined in the insulation layer 470 proximal to the mounting strut 480.

Each of the plurality of straps 12 is inserted through a corresponding insulation layer opening 474 and looped around a corresponding mounting strut 480. In other embodiments, each of the plurality of straps 12 may be looped around a first support strut (e.g., the first support strut 261) and/or a second support strut (e.g., the second support strut 263) of the support frame 460. A strap securing mechanism 14 is coupled to each of the plurality of straps 12. The strap securing mechanism 14 may comprise buckle, a winch, a lead screw, or any other suitable securing mechanism to tighten and remove any sag in the plurality of straps 12. This pushes the plurality of straps 12, and thereby the insulation layer 470 towards the SCR system 420. In this manner, the insulation layer 470 is secured to an outer surface of the SCR system 420, such that the insulation layer 470 may counter effects of gravity and other forces acting on the weight of the insulation layer 470.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A selective catalytic reduction system comprising:
   at least one catalyst configured to decompose constituents of an exhaust gas flowing therethrough; and
   an intake conduit defining an intake conduit internal volume structured to receive an exhaust gas, the intake conduit comprising:
   an intake conduit first sidewall, wherein at least a portion of the intake conduit first sidewall defines a first curvature in a circumferential direction of the first sidewall about a flow axis of the exhaust gas entering the intake conduit, wherein a plurality of first ridges are defined on the portion of the intake conduit first sidewall that defines the first curvature, the plurality of first ridges extending radially inwards into the intake conduit;

an intake conduit second sidewall coupled to the intake conduit first sidewall, wherein a catalyst first end of the at least one catalyst is fluidly coupled to the intake conduit internal volume through the intake conduit second sidewall, and wherein the intake conduit second sidewall is inclined at a first angle with respect to a longitudinal axis of the selective catalytic reduction system such that an intake conduit first end of the intake conduit receiving the exhaust gas defines an intake conduit first end cross section, and an intake conduit second end opposite the intake conduit first end defines an intake conduit second end cross-section that is smaller than the intake conduit first end cross-section; and an intake conduit third sidewall positioned at the intake conduit second end, wherein the intake conduit first sidewall and the intake conduit second sidewall are structured to cooperatively produce an even flow split of the exhaust gas through the intake conduit internal volume towards the at least one catalyst.

2. The selective catalytic reduction system of claim 1, further comprising:
an intake conduit flange fluidly coupled to the intake conduit first end; and
an intake conduit sleeve positioned on the intake conduit first sidewall proximal to the intake conduit first end, the intake conduit sleeve having an intake conduit sleeve thickness greater than an intake conduit first sidewall thickness of the intake conduit first sidewall, the intake conduit sleeve comprising:
an intake conduit sleeve first portion positioned on said at least a portion of the intake conduit first sidewall defining the first curvature,
an intake conduit sleeve second portion positioned on a flat portion of the intake conduit first sidewall, and
an intake conduit sleeve third portion extending axially from the intake conduit sleeve first portion towards the intake conduit flange, an intake conduit sleeve third portion end curving towards the intake conduit flange.

3. The selective catalytic reduction system of claim 1, further comprising:
an outlet conduit defining an outlet conduit internal volume, wherein a catalyst second end of the at least one catalyst is fluidly coupled to the outlet conduit internal volume and structured to deliver the exhaust gas thereto.

4. The selective catalytic reduction system of claim 3, wherein the outlet conduit comprises:
an outlet conduit first sidewall;
an outlet conduit second sidewall coupled to the outlet conduit first sidewall so as to define the outlet conduit, wherein the catalyst second end is fluidly coupled to the outlet conduit internal volume through the outlet conduit second sidewall, and wherein the outlet conduit second sidewall is inclined at a second angle with respect to the longitudinal axis of the selective catalytic reduction system such that an outlet conduit first end proximal to the intake conduit second end defines an outlet conduit first end cross-section, and an outlet conduit second end opposite the outlet conduit first end defines an outlet conduit second end cross-section that is smaller than the outlet conduit first end cross-section; and an outlet conduit third sidewall positioned at the outlet conduit first end.

5. The selective catalytic reduction system of claim 4, wherein the second angle is equal to the first angle.

6. The selective catalytic reduction system of claim 4, wherein the at least one catalyst is positioned such that a catalyst axial flow path of the at least one catalyst is normal to each of the first angle of inclination of the intake conduit second sidewall, and the second angle of inclination of the outlet conduit second sidewall.

7. The selective catalytic reduction system of claim 3, further comprising:
at least one catalyst sleeve fluidly coupling the intake conduit to the outlet conduit, wherein the at least one catalyst is positioned within a corresponding catalyst sleeve of the at least one catalyst sleeve.

8. The selective catalytic reduction system of claim 7, wherein at least one sleeve ramp is defined on a catalyst sleeve inner sidewall of the at least one catalyst sleeve, wherein the at least one sleeve ramp is structured to center a catalyst axial flow path of the at least one catalyst to an exhaust gas axial flow path within the corresponding catalyst sleeve.

9. The selective catalytic reduction system of claim 7, further comprising:
a securing mechanism positioned on the at least one catalyst sleeve, wherein the securing mechanism is structured to selectively secure the at least one catalyst within the corresponding catalyst sleeve.

10. The selective catalytic reduction system of claim 9, wherein the securing mechanism comprises at least one jacking bolt having a ball end, wherein the ball end of the at least one jacking bolt protrudes through the catalyst sleeve inner sidewall, and wherein the at least one jacking bolt is structured to be engaged so as to urge the ball end thereof towards the at least one catalyst, thereby securing the at least one catalyst within the corresponding catalyst sleeve.

11. An aftertreatment system, comprising
a decomposition tube comprising a decomposition tube first portion structured to receive an exhaust gas, and a decomposition tube second portion downstream of the decomposition tube first portion;
at least one catalyst configured to decompose constituents of the exhaust gas flowing therethrough; and
an intake conduit downstream of the decomposition tube second portion, the intake conduit defining an intake conduit internal volume, and the intake conduit comprising:
an intake conduit first sidewall, wherein at least a portion of the intake conduit first sidewall defines a first curvature in a circumferential direction of the first sidewall about a flow axis of the exhaust gas entering the intake conduit, wherein a plurality of first ridges are defined on the portion of the intake conduit first sidewall that defines the first curvature, the plurality of first ridges extending radially inwards into the intake conduit;
an intake conduit second sidewall coupled to the intake conduit first sidewall so as to define the intake conduit, wherein a catalyst first end of the at least one catalyst is fluidly coupled to the intake conduit internal volume through the intake conduit second sidewall, wherein the intake conduit second sidewall is inclined at a first angle with respect to a longitudinal axis of the aftertreatment system such that an intake conduit first end of the intake conduit receiving the exhaust gas defines an intake conduit first end cross section, and an intake conduit second end opposite the intake conduit first end defines an intake conduit second end cross-section smaller than the intake conduit first end cross-section; and
an intake conduit third sidewall positioned at the intake conduit second end,
wherein the intake conduit first sidewall and the intake conduit second sidewall are structured to cooperatively produce an even flow split of the exhaust gas through the intake conduit internal volume towards the at least one catalyst.

12. The aftertreatment system of claim 11, further comprising:
an intake conduit flange fluidly coupled to the intake conduit first end; and
an intake conduit sleeve positioned on the intake conduit first sidewall proximal to the intake conduit first end, the intake conduit sleeve having a intake conduit sleeve thickness greater than an intake conduit first sidewall thickness of the intake conduit first sidewall, wherein the intake conduit sleeve comprising:
an intake conduit sleeve first portion positioned on the at least a portion of the intake conduit first sidewall defining the first curvature,
an intake conduit sleeve second portion positioned on a flat portion of the intake conduit first sidewall, and
an intake conduit sleeve third portion extending axially from the intake conduit sleeve first portion towards the intake conduit flange, an intake conduit sleeve third portion end curving towards the intake conduit flange.

13. The aftertreatment system of claim 11, further comprising:
an outlet conduit defining an outlet conduit internal volume, wherein a catalyst second end of the at least one catalyst fluidly is coupled to the outlet conduit internal volume and structured to deliver the exhaust gas thereto.

14. The aftertreatment system of claim 13, wherein the outlet conduit comprises:
an outlet conduit first sidewall;
an outlet conduit second sidewall coupled to the outlet conduit first sidewall so as to define the outlet conduit, wherein the catalyst second end is fluidly coupled to the outlet conduit internal volume through the outlet conduit second sidewall, and wherein the outlet conduit second sidewall is inclined at a second angle with respect to the longitudinal axis of the aftertreatment system such that an outlet conduit first end proximal to the intake conduit second end defines an outlet conduit first end cross-section, and an outlet conduit second end opposite the outlet conduit first end defines an outlet conduit second end cross-section smaller than the outlet conduit first end cross-section; and
an outlet conduit third sidewall positioned at the outlet conduit first end.

15. The aftertreatment system of claim 14, wherein the second angle is equal to the first angle.

16. The aftertreatment system of claim 14, wherein the at least one catalyst is positioned such that a catalyst axial flow path of the at least one catalyst is normal to each of the first angle of inclination of the inlet conduit second sidewall, and the second angle of inclination of the outlet conduit second sidewall.

17. The aftertreatment system of claim 13, further comprising:
at least one catalyst sleeve fluidly coupling the intake conduit to the outlet conduit, wherein the at least one catalyst is positioned within a corresponding catalyst sleeve of the at least one catalyst sleeve.

18. The aftertreatment system of claim 17, wherein at least one sleeve ramp is defined on a catalyst sleeve inner sidewall of the at least one catalyst sleeve, wherein the at least one sleeve ramp is structured to center a catalyst axial flow path of the at least one catalyst to an exhaust gas axial flow path within the corresponding catalyst sleeve.

19. The aftertreatment system of claim 17, further comprising:
a securing mechanism positioned on the at least one catalyst sleeve, wherein the securing mechanism is structured to selectively secure the at least one catalyst within the corresponding catalyst sleeve.

20. The aftertreatment system of claim 11, wherein the decomposition tube defines a circular cross-section, the decomposition tube further comprising:
a ramp positioned between the decomposition tube first portion and the decomposition tube second portion, wherein the ramp restricts a flow path of the exhaust gas from the decomposition tube first portion to the decomposition tube second portion, and wherein the circular cross-section of the decomposition tube and the ramp are structured to cooperatively produce swirls in the exhaust gas so as to increase mixing of the exhaust gas with the reductant inserted into the decomposition tube first portion.

21. The aftertreatment system of claim 20, further comprising:
a plurality of injectors mounted on a decomposition tube first portion end of the decomposition tube first portion proximal to the decomposition tube second portion, wherein the plurality of injectors are positioned in a radial pattern about a flow axis of the exhaust gas flowing through the decomposition tube first portion, and configured to insert the reductant into the exhaust gas flowing through the decomposition tube first portion.

22. A selective catalytic reduction system, comprising:
a first leg, and a second leg symmetrically positioned opposite the first leg, the first leg structured to receive an exhaust gas first portion, and the second leg structured to receive an exhaust gas second portion, each of the first leg and the second leg comprising:
at least one catalyst configured to decompose constituents of an exhaust gas flowing therethrough;
an intake conduit comprising:
an intake conduit first sidewall, wherein at least a portion of the intake conduit first sidewall defines a first curvature in a circumferential direction of the first sidewall about a flow axis of the exhaust gas entering the intake conduit,
an intake conduit second sidewall coupled to the intake conduit first sidewall so as to define the intake conduit, wherein a catalyst first end of the at least one catalyst is fluidly coupled to the intake conduit internal volume through the intake conduit second sidewall, and wherein the intake conduit second sidewall is inclined at a first angle with respect to a longitudinal axis of the selective catalytic reduction system such that an intake conduit first end of the intake conduit receiving the exhaust gas defines an intake conduit first end cross section, and an intake conduit second end opposite the intake conduit first end defines an intake conduit second end cross-section smaller than the intake conduit first end cross-section, and an intake conduit third sidewall positioned at the intake conduit second end;

an outlet conduit defining an outlet conduit internal volume, wherein a catalyst second end of the at least one catalyst is fluidly coupled to the outlet conduit internal volume and structured to deliver the exhaust gas thereto; and an outlet conduit transition tube fluidly coupled to the outlet conduit included in each of the first leg and the second leg so as to receive the exhaust gas first portion and the exhaust gas second portion, at least a portion of the outlet conduit transition tube defining an outlet conduit transition tube cross-section greater than the outlet conduit second end cross-section, wherein the intake conduit first sidewall and the intake conduit second sidewall are structured to cooperatively produce an even flow split of the exhaust gas through the intake conduit internal volume towards the at least one catalyst.

23. The selective catalytic reduction system of claim 22, wherein the outlet conduit comprises:

an outlet conduit first sidewall;

an outlet conduit second sidewall coupled to the outlet conduit first sidewall so as to define the outlet conduit, wherein the catalyst second end is fluidly coupled to the outlet conduit internal volume through the outlet conduit second sidewall, and wherein the outlet conduit second sidewall is inclined at a second angle with respect to the longitudinal axis of the aftertreatment system such that an outlet conduit first end proximal to the intake conduit second end defines an outlet conduit first end cross-section, and an outlet conduit second end opposite the outlet conduit first end defines an outlet conduit second end cross-section smaller than the outlet conduit first end cross-section; and an outlet conduit third sidewall positioned at the outlet conduit first end.

24. A selective catalytic reduction system comprising:

at least one catalyst configured to decompose constituents of an exhaust gas flowing therethrough; and an intake conduit defining an intake conduit internal volume structured to receive an exhaust gas, the intake conduit comprising:

an intake conduit first sidewall, wherein at least a portion of the intake conduit first sidewall defines a first curvature in a circumferential direction of the first sidewall about a flow axis of the exhaust gas entering the intake conduit;

an intake conduit second sidewall coupled to the intake conduit first sidewall, wherein a catalyst first end of the at least one catalyst is fluidly coupled to the intake conduit internal volume through the intake conduit second sidewall, and wherein the intake conduit second sidewall is inclined at a first angle with respect to a longitudinal axis of the selective catalytic reduction system such that an intake conduit first end of the intake conduit receiving the exhaust gas defines an intake conduit first end cross section, and an intake conduit second end opposite the intake conduit first end defines an intake conduit second end cross-section that is smaller than the intake conduit first end cross-section;

an intake conduit third sidewall positioned at the intake conduit second end;

an intake conduit flange fluidly coupled to the intake conduit first end; and an intake conduit sleeve positioned on the intake conduit first sidewall proximal to the intake conduit first end, the intake conduit sleeve having an intake conduit sleeve thickness greater than an intake conduit first sidewall thickness of the intake conduit first sidewall, the intake conduit sleeve comprising:

an intake conduit sleeve first portion positioned on said at least a portion of the intake conduit first sidewall defining the first curvature, an intake conduit sleeve second portion positioned on a flat portion of the intake conduit first sidewall, and an intake conduit sleeve third portion extending axially from the intake conduit sleeve first portion towards the intake conduit flange, an intake conduit sleeve third portion end curving towards the intake conduit flange, wherein the intake conduit first sidewall and the intake conduit second sidewall are structured to cooperatively produce an even flow split of the exhaust gas through the intake conduit internal volume towards the at least one catalyst.

25. A selective catalytic reduction system, comprising:

at least one catalyst configured to decompose constituents of an exhaust gas flowing therethrough; and an intake conduit defining an intake conduit internal volume structured to receive an exhaust gas, the intake conduit comprising:

an intake conduit first sidewall, wherein at least a portion of the intake conduit first sidewall defines a first curvature in a circumferential direction of the first sidewall about a flow axis of the exhaust gas entering the intake conduit, an intake conduit second sidewall coupled to the intake conduit first sidewall, wherein a catalyst first end of the at least one catalyst is fluidly coupled to the intake conduit internal volume through the intake conduit second sidewall, and wherein the intake conduit second sidewall is inclined at a first angle with respect to a longitudinal axis of the selective catalytic reduction system such that an intake conduit first end of the intake conduit receiving the exhaust gas defines an intake conduit first end cross section, and an intake conduit second end opposite the intake conduit first end defines an intake conduit second end cross-section that is smaller than the intake conduit first end cross-section, and an intake conduit third sidewall positioned at the intake conduit second end;

an outlet conduit defining an outlet conduit internal volume, wherein a catalyst second end of the at least one catalyst is fluidly coupled to the outlet conduit internal volume and structured to deliver the exhaust gas thereto;

at least one catalyst sleeve fluidly coupling the intake conduit to the outlet conduit, wherein the at least one catalyst is positioned within a corresponding catalyst sleeve of the at least one catalyst sleeve, at least one sleeve ramp being defined on a catalyst sleeve inner sidewall of the at least one catalyst sleeve, the at least one sleeve ramp being structured to center a catalyst axial flow path of the at least one catalyst to an exhaust gas axial flow path within the corresponding catalyst sleeve, wherein the intake conduit first sidewall and the intake conduit second sidewall are structured to cooperatively produce an even flow split of the exhaust gas through the intake conduit internal volume towards the at least one catalyst.

26. A selective catalytic reduction system, comprising:

at least one catalyst configured to decompose constituents of an exhaust gas flowing therethrough; and an intake conduit defining an intake conduit internal volume structured to receive an exhaust gas, the intake conduit comprising:
- an intake conduit first sidewall, wherein at least a portion of the intake conduit first sidewall defines a first curvature in a circumferential direction of the first sidewall about a flow axis of the exhaust gas entering the intake conduit,
- an intake conduit second sidewall coupled to the intake conduit first sidewall, wherein a catalyst first end of the at least one catalyst is fluidly coupled to the intake conduit internal volume through the intake conduit second sidewall, and wherein the intake conduit second sidewall is inclined at a first angle with respect to a longitudinal axis of the selective catalytic reduction system such that an intake conduit first end of the intake conduit receiving the exhaust gas defines an intake conduit first end cross section, and an intake conduit second end opposite the intake conduit first end defines an intake conduit second end cross-section that is smaller than the intake conduit first end cross-section, and
- an intake conduit third sidewall positioned at the intake conduit second end;

an outlet conduit defining an outlet conduit internal volume, wherein a catalyst second end of the at least one catalyst is fluidly coupled to the outlet conduit internal volume and structured to deliver the exhaust gas thereto;

at least one catalyst sleeve fluidly coupling the intake conduit to the outlet conduit, wherein the at least one catalyst is positioned within a corresponding catalyst sleeve of the at least one catalyst sleeve; and a securing mechanism positioned on the at least one catalyst sleeve, wherein the securing mechanism is structured to selectively secure the at least one catalyst within the corresponding catalyst sleeve, the securing mechanism comprising at least one jacking bolt having a ball end, the ball end of the at least one jacking bolt protruding through the catalyst sleeve inner sidewall, the at least one jacking bolt being structured to be engaged so as to urge the ball end thereof towards the at least one catalyst, thereby securing the at least one catalyst within the corresponding catalyst sleeve, wherein the intake conduit first sidewall and the intake conduit second sidewall are structured to cooperatively produce an even flow split of the exhaust gas through the intake conduit internal volume towards the at least one catalyst.

27. An aftertreatment system, comprising a decomposition tube comprising a decomposition tube first portion structured to receive an exhaust gas, and a decomposition tube second portion downstream of the decomposition tube first portion;

at least one catalyst configured to decompose constituents of the exhaust gas flowing therethrough; and an intake conduit downstream of the decomposition tube second portion, the intake conduit defining an intake conduit internal volume, and the intake conduit comprising:
- an intake conduit first sidewall, wherein at least a portion of the intake conduit first sidewall defines a first curvature in a circumferential direction of the first sidewall about a flow axis of the exhaust gas entering the intake conduit;
- an intake conduit second sidewall coupled to the intake conduit first sidewall so as to define the intake conduit, wherein a catalyst first end of the at least one catalyst is fluidly coupled to the intake conduit internal volume through the intake conduit second sidewall, wherein the intake conduit second sidewall is inclined at a first angle with respect to a longitudinal axis of the aftertreatment system such that an intake conduit first end of the intake conduit receiving the exhaust gas defines an intake conduit first end cross section, and an intake conduit second end opposite the intake conduit first end defines an intake conduit second end cross-section smaller than the intake conduit first end cross-section; and
- an intake conduit third sidewall positioned at the intake conduit second end;

an intake conduit flange fluidly coupled to the intake conduit first end; and an intake conduit sleeve positioned on the intake conduit first sidewall proximal to the intake conduit first end, the intake conduit sleeve having a intake conduit sleeve thickness greater than an intake conduit first sidewall thickness of the intake conduit first sidewall, wherein the intake conduit sleeve comprising:
- an intake conduit sleeve first portion positioned on the at least a portion of the intake conduit first sidewall defining the first curvature,
- an intake conduit sleeve second portion positioned on a flat portion of the intake conduit first sidewall, and
- an intake conduit sleeve third portion extending axially from the intake conduit sleeve first portion towards the intake conduit flange, an intake conduit sleeve third portion end curving towards the intake conduit flange, wherein the intake conduit first sidewall and the intake conduit second sidewall are structured to cooperatively produce an even flow split of the exhaust gas through the intake conduit internal volume towards the at least one catalyst.

28. A selective catalytic reduction system, comprising:

at least one catalyst configured to decompose constituents of an exhaust gas flowing therethrough; and an intake conduit defining an intake conduit internal volume structured to receive an exhaust gas, the intake conduit comprising:
- an intake conduit first sidewall, wherein at least a portion of the intake conduit first sidewall defines a first curvature in a circumferential direction of the first sidewall about a flow axis of the exhaust gas entering the intake conduit,
- an intake conduit second sidewall coupled to the intake conduit first sidewall, wherein a catalyst first end of the at least one catalyst is fluidly coupled to the intake conduit internal volume through the intake conduit second sidewall, and wherein the intake conduit second sidewall is inclined at a first angle with respect to a longitudinal axis of the selective catalytic reduction system such that an intake conduit first end of the intake conduit receiving the exhaust gas defines an intake conduit first end cross section, and an intake conduit second end opposite the intake conduit first end defines an intake conduit second end cross-section that is smaller than the intake conduit first end cross-section, and an intake conduit third sidewall positioned at the intake conduit second end;

an outlet conduit defining an outlet conduit internal volume, wherein a catalyst second end of the at least one catalyst is fluidly coupled to the outlet conduit internal volume and structured to deliver the exhaust gas thereto;

at least one catalyst sleeve fluidly coupling the intake conduit to the outlet conduit, wherein the at least one catalyst is positioned within a corresponding catalyst sleeve of the at least one catalyst sleeve; and at least one sleeve ramp is defined on a catalyst sleeve inner sidewall of the at least one catalyst sleeve, wherein the at least one sleeve ramp is structured to center a catalyst axial flow path of the at least one catalyst to an exhaust gas axial flow path within the corresponding catalyst sleeve, wherein the intake conduit first sidewall and the intake conduit second sidewall are structured to cooperatively produce an even flow split of the exhaust gas through the intake conduit internal volume towards the at least one catalyst.

* * * * *